US007531601B2

(12) United States Patent
Karjala et al.

(10) Patent No.: US 7,531,601 B2
(45) Date of Patent: May 12, 2009

(54) INTERPOLYMERS SUITABLE FOR USE IN HOT MELT ADHESIVES AND PROCESSES TO PREPARE SAME

(75) Inventors: Teresa Karjala, Lake Jackson, TX (US); Brian W. S. Kolthammer, Lake Jackson, TX (US)

(73) Assignee: Dow Global Technologies, Inc., Midland, MI (US)

( * ) Notice: Subject to any disclaimer, the term of this patent is extended or adjusted under 35 U.S.C. 154(b) by 0 days.

(21) Appl. No.: 10/567,142

(22) PCT Filed: Sep. 17, 2004

(86) PCT No.: PCT/US2004/030706

§ 371 (c)(1),
(2), (4) Date: Feb. 6, 2006

(87) PCT Pub. No.: WO2005/028584

PCT Pub. Date: Mar. 31, 2005

(65) Prior Publication Data

US 2006/0287444 A1     Dec. 21, 2006

Related U.S. Application Data

(60) Provisional application No. 60/504,412, filed on Sep. 19, 2003.

(51) Int. Cl.
   *C08L 23/08*    (2006.01)
(52) U.S. Cl. .............................. 525/240; 525/241
(58) Field of Classification Search ............... 524/240; 525/240, 241
See application file for complete search history.

(56) References Cited

U.S. PATENT DOCUMENTS

| | | | |
|---|---|---|---|
| 3,253,059 A | 5/1966 | Volmer | |
| 4,914,253 A | 4/1990 | Chang | |
| 4,937,299 A | 6/1990 | Ewen et al. | |
| 4,939,217 A | 7/1990 | Stricklen | |
| 4,956,207 A | 9/1990 | Kauffman et al. | |
| 5,055,438 A | 10/1991 | Canich | |
| 5,272,236 A | 12/1993 | Lai et al. | |
| 5,278,272 A | 1/1994 | Lai et al. | |
| 5,377,843 A | 1/1995 | Schumacher et al. | |
| 5,382,630 A | 1/1995 | Stehling et al. | |
| 5,382,631 A | 1/1995 | Stehling et al. | |
| 5,530,054 A | 6/1996 | Tse et al. | |
| 5,530,065 A | 6/1996 | Farley et al. | |
| 5,548,014 A | 8/1996 | Tse et al. | |
| 5,591,792 A | 1/1997 | Hattori et al. | |
| 5,703,187 A * | 12/1997 | Timmers | 526/282 |
| 6,008,262 A | 12/1999 | McKay et al. | |
| 6,054,544 A | 4/2000 | Finlayson et al. | |
| 6,107,430 A * | 8/2000 | Dubois et al. | 526/348.5 |
| 6,120,887 A | 9/2000 | Werenicz et al. | |
| 6,150,297 A * | 11/2000 | Campbell et al. | 502/152 |
| 6,221,448 B1 | 4/2001 | Baetzold et al. | |
| 6,300,398 B1 | 10/2001 | Jialanella et al. | |
| 6,319,979 B1 | 11/2001 | Dubois et al. | |
| 6,323,285 B1 | 11/2001 | Johnston et al. | |
| 6,335,410 B1 | 1/2002 | Finlayson et al. | |
| 6,339,112 B1 | 1/2002 | Kauffman et al. | |
| 6,534,572 B1 | 3/2003 | Ahmed et al. | |
| 6,538,070 B1 | 3/2003 | Cardwell et al. | |
| 6,545,088 B1 | 4/2003 | Kolthammer et al. | |
| 6,566,446 B1 | 5/2003 | Parikh et al. | |
| 6,579,915 B2 | 6/2003 | Kroll et al. | |
| 6,582,829 B1 | 6/2003 | Quinn et al. | |
| 6,657,000 B1 | 12/2003 | De Keyzer et al. | |
| 6,723,810 B2 | 4/2004 | Kolthammer et al. | |
| 6,825,147 B2 * | 11/2004 | Klosin et al. | 502/117 |
| 7,199,180 B1 | 4/2007 | Simmons et al. | |

(Continued)

FOREIGN PATENT DOCUMENTS

EP     0115434     8/1984

(Continued)

OTHER PUBLICATIONS

Beigzadeh, D., et al., Recipes for Synthesizing Polyolefins with Tailor-Made Molecular Weight, Polydispersity Index, Long-Chain Branching Frequencies, and Chemical Composition Using Combined Metallocene Catalyst Systems in a CSTR at Steady State, Journal of Applied Polymer Science, 1999, pp. 1753-1770, vol. 71, John Wiley & Sons, Inc.

Markel, E.J., et al., Metallocene-Based Branch-Block Thermoplastic Elastomers, Macromolecules, 2000, pp. 8541-8548, vol. 33 No. 23, American Chemical Society.

Soares, J.B.P. et al., Maximizing Long Chain Branch Formation in Polyethylene Made With Combined Metallocene Catalysts, Proceedings of Ninth International Business Forum on Specialty Polyolefins, 1999, pp. 103-117.

Tse, "Application of Adhesion Model for Developing Hot Melt Adhesives Bonded to Polyolefin Surfaces," Journal of Adhesion, vol. 48, Issue 1-4, pp. 149-167 (1995).

*Primary Examiner*—Caixia Lu

(57) ABSTRACT

The present invention relates to an ethylene/α-olefin interpolymer product comprising at least one α-olefin interpolymerized with ethylene and, characterized in at least one aspect, as having improved properties when utilized in a hot melt adhesive formulation. The invention also relates to a process for manufacturing the interpolymer product wherein the process comprises employing two or more single site catalyst systems in at least one reaction environment (or reactor) and wherein the at least two catalyst systems have (a) different comonomer incorporation capabilities or reactivities and/or (b) different termination kinetics, both when measured under the same polymerization conditions. The interpolymer products are useful, for example, in applications such as hot melt adhesives, and also for impact, bitumen and asphalt modification, adhesives, dispersions or latexes and fabricated articles such as, but not limited to, foams, films, sheet, moldings, thermoforms, profiles and fibers.

15 Claims, No Drawings

U.S. PATENT DOCUMENTS

| | | |
|---|---|---|
| 7,335,696 B2 | 2/2008 | Yalvac et al. |
| 2004/0236002 A1 | 11/2004 | Hassan et al. |
| 2006/0014901 A1 | 1/2006 | Hassan et al. |
| 2006/0030667 A1 | 2/2006 | Yalvac et al. |

FOREIGN PATENT DOCUMENTS

| | | |
|---|---|---|
| EP | 0416815 | 3/1991 |
| EP | 0442045 A2 | 8/1991 |
| EP | 0608175 A1 | 7/1994 |
| EP | 0 659 773 B2 | 12/2001 |
| JP | S61(1986)-236804 | 10/1986 |
| JP | S62(1987)-129303 | 6/1987 |
| WO | WO-92/12212 | 7/1992 |
| WO | WO-93/11184 | 6/1993 |
| WO | WO-94/00500 A1 | 1/1994 |
| WO | WO-94/10256 | 5/1994 |
| WO | WO-97/15636 | 5/1997 |
| WO | WO 97/33921 | 9/1997 |
| WO | WO-97/48735 | 12/1997 |
| WO | WO-00/49059 | 8/2000 |
| WO | WO-00/50466 | 8/2000 |
| WO | WO-01/99121 A1 | 12/2001 |
| WO | WO-02/074816 A2 | 9/2002 |
| WO | WO-02/074817 A2 | 9/2002 |
| WO | WO 2004/031292 | 4/2004 |
| WO | WO 2004/035680 | 4/2004 |
| WO | WO-2004/104127 A2 | 12/2004 |

* cited by examiner

INTERPOLYMERS SUITABLE FOR USE IN HOT MELT ADHESIVES AND PROCESSES TO PREPARE SAME

REFERENCE TO RELATED APPLICATIONS

This application is a U.S. National Stage Application, under 35 U.S.C. § 371, of International Application No. PCT/US04/30706, filed on Sep. 17, 2004, which claims the benefit of U.S. Provisional Application No. 60/504,412, filed on Sep. 19, 2003.

FIELD OF THE INVENTION

The present invention relates to an ethylene/α-olefin interpolymer product comprising at least one α-olefin interpolymerized with ethylene and, characterized in at least one aspect, as having improved properties when utilized in a hot melt adhesive formulation. The invention also relates to a process for manufacturing the interpolymer product wherein the process comprises employing two or more single site catalyst systems in at least one reaction environment (or reactor) and wherein at least two catalyst systems have (a) different comonomer incorporation capabilities or reactivities and/or (b) different termination kinetics, both when measured under the same polymerization conditions. The interpolymer products are useful, for example, in applications such as hot melt adhesives, and also for impact, bitumen and asphalt modification, adhesives, dispersions or latexes and fabricated articles such as, but not limited to, foams, films, sheet, moldings, thermoforms, profiles and fibers.

BACKGROUND OF THE INVENTION

Ethylene homopolymers and copolymers are a well-known class of olefin polymers from which various plastic products are produced. Such products include hot melt adhesives. The polymers used to make such adhesives can be prepared from ethylene, optionally with one or more copolymerizable monomers. One process used to produce ethylene homopolymers and copolymers involves use of a coordination catalyst, such as a Ziegler-Natta catalyst, under low pressures. Conventional Ziegler-Natta catalysts are typically composed of many types of catalytic species, each having different metal oxidation states and different coordination environments with ligands. Examples of such heterogeneous systems are known and include metal halides activated by an organometallic co-catalyst, such as titanium chloride supported on magnesium chloride, activated with trialkylaluminum compounds. Because these systems contain more than one catalytic species, they possess polymerization sites with different activities and varying abilities to incorporate comonomer into a polymer chain. The consequence of such multi-site chemistry is a product with poor control of the polymer chain architecture, when compared to a neighboring chain. Moreover, differences in the individual catalyst site produce polymers of high molecular weight at some sites and low molecular weight at others, resulting in a polymer with a heterogeneous composition. The molecular weight distribution (as indicated by $M_w/M_n$, also referred to as polydispersity index or "PDI" or "MWD") of such polymers can be fairly broad. For some combinations of heterogeneity and broad MWD, the mechanical and other properties of the polymers are sometimes less desirable in certain applications than in others.

Another catalyst technology useful in the polymerization of olefins is based on the chemistry of single-site homogeneous catalysts, including metallocenes which are organometallic compounds containing one or more cyclopentadienyl ligands attached to a metal, such as hafnium, titanium, vanadium, or zirconium. A co-catalyst, such as oligomeric methylaluminoxane (also called methylalumoxane), is often used to promote the catalytic activity of the catalyst.

The uniqueness of single site catalysts, including metallocenes, resides in part in the steric and electronic equivalence of each active catalyst site. Specifically, these catalysts are characterized as having a single, stable chemical site rather than a mixture of sites as discussed above for conventional Ziegler-Natta catalysts. The resulting system is composed of catalytic species which have a singular activity and selectivity. Polymers produced by such catalysts are often referred to as homogeneous- or single site-resins in the art.

A consequence of such singular reactivity is that by variation in the metal component and/or the ligands and ligand substituents of the transition metal complex component of the single site catalyst, a myriad of polymer products may be tailored. These include oligomers and polymers with molecular weights (Mn) ranging from about 200 to greater than 1,000,000. In addition, by varying the metal component and/or the ligands and ligand substituents of the single site catalyst, it is also possible in ethylene alpha olefin interpolymerizations to vary the comonomer reactivity of the catalyst, such that very different levels of comonomer are incorporated at a given comonomer concentration. Thus it is also possible to tailor the density of the product from products with high comonomer incorporation (resulting in densities lower than 0.900 g/cm³), through to products with almost no comonomer incorporation (resulting in densities greater than 0.950 g/cm³), both at the same comonomer concentration in the reactor.

One method of utilizing this variation in single site catalyst reactivity is to employ two or more such catalysts in conjunction with a multiple reactor configuration, to produce so-called in reactor resin blends which are a combination of products made by each catalyst In this case, there exists the ability to: i) control the polymerization conditions in each reactor independently, ii) control the contribution of each reactor product to the final polymer composition (the so called reactor split ratio) and iii) supply each reactor with a single-site catalyst, allows such a process to produce a wide range of polymeric products that are combinations of each reactor product. The ability to produce such in-reactor blends as opposed to post reactor blending of separately prepared components has definite process, economic and product flexibility advantages in applications calling for a product which cannot be made in a single reactor single catalyst or dual reactor single catalyst configuration.

In addition, the mutual compatibility of single site catalyst mixtures (as opposed to a mixture of a single site and traditional Ziegler catalyst) also allows for the possibility of producing a broad range of in-reactor blend products in a single reactor, even under the same polymerization conditions by introducing single site catalysts of differing comonomer reactivity and/or termination kinetics into the reactor, and varying their relative amounts to yield the desired final polymer properties. In this mode, in-reactor blends may also be prepared which again are otherwise unavailable except by post reactor blending of separately prepared components.

There a number of examples of both types of products and processes in the prior art. For instance, U.S. Pat. No. 5,530,065 (Farley et al.) discloses heat sealed articles and heat sealable films comprising a polymer blend of a first polymer having a narrow molecular weight distribution and composition distribution and a second polymer having a broad molecular weight distribution and composition distribution.

U.S. Pat. Nos. 5,382,630 and 5,382,631 (Stehling et al.) discloses linear ethylene interpolymer blends with improved properties made from components having a narrow molecular weight distribution (Mw/Mn≦3) and a narrow composition distribution (CDBI>50%).

U.S. Pat. No. 6,545,088 B1 (Kolthammer et al.) discloses a process for polymerizing ethylene, an alpha-olefin and optionally a diene catalyzed by a metallocene catalyst in either a single or multiple reactors.

U.S. Pat. No. 6,566,446 B1 (Kolthammer et al.) discloses a process comprising interpolymerizing a first homogeneous ethylene/alpha-olefin interpolymer and at least one second homogeneous ethylene/alpha-olefin interpolymer using at least two constrained geometry catalysts. The catalysts have different reactivities such that the first interpolymer has a narrow molecular weight distribution and a very high comonomer content and relatively high molecular weight, and the second ethylene/alpha olefin interpolymer has a narrow molecular weight distribution and a low comonomer content and a molecular weight lower than that of the first interpolymer. The interpolymers can be polymerized in a single reactor or separate reactors operated in parallel of series.

WO 97/48735 (Canich et al.) discloses a mixed transition metal olefin polymerization catalyst system comprising one late transition metal catalyst and at least one different catalyst system selected from the group consisting of late transition metal catalyst systems, transition metal metallocene catalyst systems or Ziegler-Natta catalyst systems.

U.S. Pat. No. 4,939,217 (Stricklen) discloses a process for producing a polyolefin having a multimodal molecular weight distribution wherein the polymerization is conducted in the presence of hydrogen and a catalyst system containing alumoxane and at least two different metallocenes each having different olefin polymerization termination rate constants.

U.S. Pat. No. 4,937,299 (Ewen et al.) discloses polyolefin reactor blends obtained by polymerization of ethylene and higher alpha-olefins in the presence of a catalyst system comprising two or more metallocenes and alumoxane.

WO 02/074816A2 (deGroot et al.) discloses a polymer composition (and process for making) which comprises: (a) a high molecular weight, branched component; and (b) a low molecular weight, branched component.

WO 02/074817A2 (Stevens et al.) discloses a polymerization process which comprises contacting one or more olefinic comonomers in the presence of at least a high molecular weight catalyst and at least a low molecular weight catalyst in a single reactor; and effectuating the polymerization of the olefinic comonomers in the reactor to obtain an olefin polymer, whereby both catalysts have the ability to incorporate a substantially similar amount of comonomers in the olefin polymer.

Such flexibility in polymer preparation is highly desirable in certain applications, which call for a special and unique combination of polymer properties. One such example is a polymer formulation employed in hot melt adhesive ("HMA") formulations. Most hot melt adhesives are three component mixtures of a polymeric resin, a wax, and a tackifying agent. Although each component is generally present in roughly equal proportions in an HMA formulation, their relative ratio is often "fine tuned" for a particular application's need. Typically, the polymer component provides the strength to the adhesive bond, while the wax reduces the overall viscosity of the system simplifying application of the adhesive to the substrate to be bonded.

The polymeric resin of an HMA can be ethylene homopolymers and interpolymers of a selected molecular weight and density. Such interpolymers can be a single polymer or a blend composition. For instance, U.S. Pat. No. 5,530,054, issued Jun. 25, 1996 to Tse et al., claims a hot melt adhesive composition consisting essentially of: (a) 30 percent to 70 percent by weight of a copolymer of ethylene and about 6 percent to about 30 percent by weight of a $C_3$ to $C_{20}$ α-olefin produced in the presence of a catalyst composition comprising a metallocene and an alumoxane and having an $M_W$ of from about 20,000 to about 100,000; and (b) a hydrocarbon tackifier which is selected from a recited list.

U.S. Pat. No. 5,548,014, issued Aug. 20, 1996 to Tse et al., claims a hot melt adhesive composition comprising a blend of ethylene/alpha-olefin copolymers wherein the first copolymer has a $M_W$ from about 20,000 to about 39,000 and the second copolymer has a $M_W$ from about 40,000 to about 100,000. Each of the hot melt adhesives exemplified comprises a blend of copolymers, with at least one of the copolymers having a polydispersity greater than 2.5. Furthermore, the lowest density copolymer exemplified has a specific gravity of 0.894 g/cm$^3$.

However, it would be highly advantageous in such HMA applications to have access to a synthetic polymer with properties such that it can substitute for both the wax and polymer components of a hot melt adhesive formulation.

It would also be highly advantageous to have a process for preparing such polymer composition comprising a minimum of mixing steps, thus minimizing the cost and variability of the formulation.

It would also be highly advantageous to have a polymer composition for use in an HMA formulation, and a process for its preparation which negates the requirement of incorporating expensive petroleum waxes into hot melt adhesive formulations that are primarily imported and or derived from imported oil based feedstocks.

Finally, it would also be highly advantageous to have access to a synthetic polymer: i) with properties such that it can substitute for both the wax and polymer components of a hot melt adhesive formulation; ii) which can be prepared by a process comprising a minimum of mixing steps, thus minimizing the cost and variability of the formulation; iii) which when incorporated into a hot melt adhesive formulation, negates the need for expensive petroleum waxes (primarily imported and or derived from imported oil based feedstocks) in hot melt adhesive formulations; and iv) which when incorporated into HMA formulations, said formulations are able to exhibit the strength and adhesion characteristics of commercial HMAs, while also exhibiting improved thermal and oxidative stability.

SUMMARY OF THE INVENTION

The present invention is an ethylene alpha olefin interpolymer having a density of from about 0.88 to about 1.06 g/cm$^3$, preferably from about 0.88 to about 0.93 g/cm$^3$, more preferably from about 0.89 to about 0.92 g/cm$^3$, and even more preferably from about 0.895 to about 0.915 g/cm$^3$. When the ethylene alpha olefin interpolymer comprises styrene comonomer, the density suitably ranges from about 0.931 to about 1.06 g/cm$^3$, preferably from about 0.931 to about 1.03 g/cm$^3$, and also preferably from about 0.931 to about 0.96 g/cm$^3$.

The ethylene alpha olefin interpolymer of the present invention has a number average molecular weight (Mn as measured by GPC) of from about 1,000, preferably from about 1,250, more preferably about 1,500 and even more preferably from about 2,000 up to about 9,000, preferably up to about 7,000, and more preferably up to about 6,000.

The ethylene alpha olefin interpolymer of the present invention has a Brookfield Viscosity (measured at 300° F./149° C.) of from about 500, preferably about 1,000, and more preferably from about 1,500 up to about 7,000 cP, preferably to about 6,000 cP, more preferably up to about 5,000 cP.

The ethylene alpha olefin interpolymer of the present invention when mixed with a tackifier results in an adhesive composition having a Brookfield Viscosity (measured at 350° F./177° C.) of from about 400, preferably about 500 and more preferably from about 750 up to about 2,000 cP, preferably to about 1,400 cP, more preferably up to about 1,200 cP.

The ethylene alpha olefin interpolymer of the present invention when mixed with a tackifier results in an adhesive composition having a Peel Adhesion Failure Temperature (PAFT) of greater than or equal to 110° F. (43.3° C.), preferably greater than or equal to 115° F. (46.1° C.), more preferably greater than or equal to 120° F. (48.8° C.).

The ethylene alpha olefin interpolymer of the present invention when mixed with a tackifier results in an adhesive composition having a Shear Adhesion Failure Temperature (SAFT) of greater than or equal to 140° F. (60° C.), greater than or equal to 150° F. (65.5° C.), more preferably greater than or equal to 170° F. (76.7° C.).

The ethylene alpha olefin interpolymer of the present invention when mixed with a tackifier results in an adhesive composition which exhibits 100% paper tear from 77 to 140° F. (25° to 60° C.), preferably 100% paper tear from 35 to 140° F. (1.7° to 60° C.), and most preferably 100% paper tear from 0 to 140° F. (negative 17.7° C. to 60° C.).

The resulting adhesive compositions noted above, suitably serve as hot melt adhesives when appropriately formulated, for various end applications in which such HMAs typically are employed.

Another embodiment of the invention provides a process of making an ethylene alpha olefin interpolymer, comprising (a) contacting one or more olefinic monomers in the presence of at least two catalysts; and (b) effectuating the polymerization of the olefinic monomers in one or more reactors to obtain an olefin polymer, wherein each catalyst has the ability to incorporate a different amount of comonomer in the polymer, and/or wherein each catalyst is capable of producing a polymer with substantially different molecular weights from the monomers under selected polymerization conditions.

In the processes of the present invention, one catalyst produces a polymer that has a molecular weight $M_{wH}$ and the second catalyst produces a polymer with a molecular weight $M_{wL}$. The process involves producing a $C_{2-20}$ olefin homopolymer or interpolymer, comprising (a) providing controlled addition of a first catalyst to a reactor, (b) providing controlled addition of a second catalyst to the reactor, each catalysts having different comonomer incorporation ability, (c) continuously feeding one or more $C_{2-20}$ olefins into a reactor, (d) continuously feeding each catalyst into a reactor at a rate sufficient to produce a polymer, wherein i) the ratio of the molecular weight (Mw as measured by GPC) of the polymer produced by one catalyst to the molecular weight of the polymer produced by the other catalyst, $M_{wH}/M_{wL}$ is from about 1, preferably about 1.5, more preferably from about 2 and up to about 20, preferably up to about 15, more preferably up to about 10; and/or ii) the reactivity towards comonomer of each catalyst, as described by the ratio, $r_1^H/r_1^L$, should fall between about 0.03, preferably between about 0.05 and more preferably between about 0.1 and about 30, preferably about 20, and more preferably about 10.

In some embodiments of the process, the polymerization is conducted in a single reactor. In other embodiments, the polymerization is conducted in two or more reactors wherein the first reactor is connected to the second reactor in parallel so that the mixing occurs in a third reactor. In another embodiment, the first reactor is connected to the second reactor in series, while in others the first-reactor contents are sequentially introduced into the second reactor.

In some embodiments, such processes are performed under continuous solution polymerization conditions. In some embodiments, the second reactor is operated under continuous solution polymerization conditions. In some embodiments, ethylene has a steady state concentration of about 3.5% or less by weight of the first-reactor contents, about 2.5% or less by weight of the reactor content, or about 2.0% or less by weight of the first-reactor contents. In certain processes, the first reactor has a polymer with a steady state concentration of about 10% or more by weight of the first-reactor contents, about 18% or more by weight of the reactor content, or about 20% or more by weight of the reactor content.

DETAILED DESCRIPTION OF THE INVENTION

The present invention provides an ethylene alpha olefin interpolymer with desired processability and physical characteristics. The present invention also provides a new process for making the interpolymer, comprising contacting one or more olefinic monomers or comonomers in the presence two or more single site catalysts (when employing a single reactor) or one or more single site catalysts (when employing a multiple reactor process); and effectuating the polymerization of the olefinic comonomers in said reactor(s) to obtain an olefin polymer. Preferably, the catalysts have the ability to incorporate a substantially different amount of comonomer in the polymer produced, and/or produce a polymer of substantially different molecular weight under selected polymerization conditions.

In the following description, all numbers disclosed are approximate values, regardless whether the word "about" or "approximately" is used in connection therewith. They may vary by up to 1%, 2%, 5%, or sometimes 10 to 20%. Whenever a numerical range with a lower limit, $R_L$, and an upper limit $R_U$, is disclosed, any number R falling within the range is specifically disclosed. In particular, the following numbers R within the range are specifically disclosed: $R=R_L+k*(R_U-R_L)$, wherein k is a variable ranging from 1% to 100% with a 1% increment, i.e. k is 1%, 2%, 3%, 4%, 5%, ..., 50%, 51%, 52%, ..., 95%, 96%, 97%, 98%, 99%, or 100%. Moreover, for any numerical range defined by two numbers then R, as defined in the text above, is also specifically disclosed.

The term "polymer" as used herein refers to a macromolecular compound prepared by polymerizing monomers of the same or a different type. A polymer refers to homopolymers, copolymers, terpolymers, interpolymers, and so on.

The term "interpolymer" used herein refers to a polymer prepared by the polymerization of at least two types of monomers or comonomers. It includes, but is not limited to, copolymers (which usually refers to polymers prepared from two different monomers or comonomers), terpolymers (which usually refers to polymers prepared from three different types of monomers or comonomers), and tetrapolymers (which usually refers to polymers prepared from four different types of monomers or comonomers), and the like.

The term "narrow composition distribution" used herein describes the comonomer distribution for homogeneous interpolymers. The narrow composition distribution homogeneous interpolymers can also be characterized by their SCBDI (short chain branch distribution index) or CDBI (composition distribution branch index). The SCBDI or CBDI is defined as the weight percent of the polymer molecules having a comonomer content within 50 percent of the median total molar comonomer content.

The CDBI of a polymer is readily calculated from data obtained from techniques known in the art, such as, for example, temperature rising elution fractionation (abbreviated herein as "TREF") as described, for example, in Wild et al, Journal Of Polymer Science, Poly. Phys. Ed., Vol. 20, p. 441 (1982), or in U.S. Pat. No. 5,548,014, the disclosure of which are incorporated herein by reference. Thus, the following procedure for calculating CDBI can be used:

(1) Generate a normalized, cumulative distribution plot of copolymer concentration versus elution temperature, obtained from the TREF.
(2) Determine the elution temperature at which 50 weight percent of the dissolved copolymer has eluted.
(3) Determine the molar comonomer content within the copolymer fraction eluting at that median elution temperature.
(4) Calculate limiting mole fraction values of 0.5 times and 1.5 times the molar comonomer content within the copolymer fraction eluting at that median temperature.
(5) Determine limiting elution temperature values associated with those limiting mole fraction values.
(6) Partially integrate that portion of the cumulative elution temperature distribution between those limiting elution temperature values.
(7) Express the result of that partial integration, CDBI, as a percentage of the original, normalized, cumulative distribution plot.

The term "different catalyst systems" is used herein in reference to catalyst systems, which incorporate monomers at different amounts during interpolymerization. While the term principally refers to catalyst systems having different chemical compositions relative to one another, the term generally refers to any difference that results in different monomer incorporation or different polymerization reactivities or rates. As such, the term also refers to differences in concentrations, operating conditions, injection methods or timing and the like where the catalyst systems have the same chemical composition.

One factor that influences the overall MWD is the difference between the molecular weights of the HMW component and the LMW component. In some embodiments, the ratio of the molecular weights of the polymer produced by one catalyst to the molecular weight of the polymer produced by the other catalyst, $M_{wH}/M_{wL}$ is from about 1 to about 20, preferably from about 1.5 to about 15, more preferably from about 2 to about 10.

Another factor that can have a substantial effect on the overall MWD is the "polymer split" of the composition. A "polymer split" is defined as the weight fraction of the high molecular weight polymer component in a polymer composition. The relative fractions of the high and low molecular weight components are determined from the deconvoluted GPC peak. The polymer composition of the present invention has a split of about 30% to about 70%, preferably of from about 40% to about 60%, more preferably of from about 45% to about 55%.

In the process, a high molecular weight catalyst is defined relative to a low molecular weight catalyst. A high weight molecular weight catalyst refers to a catalyst which produces a polymer with a high weight-average molecular weight $M_{wH}$ from the monomers and any comonomers of choice under a set of given polymerization conditions, whereas a low molecular weight catalyst refers to a catalyst which produces a polymer with a low weight average molecular weight $M_{wL}$ from the same monomers and comonomers under substantially the same polymerization conditions. Therefore, the terms "low molecular weight catalyst" and "high molecular weight catalyst" used herein do not refer to the molecular weight of a catalyst; rather, they refer to a catalyst's ability to make a polymer with a low or high molecular weight. The intrinsic molecular weight differences in the polymer produced by the chosen high and low molecular weight catalysts produces the "polymer split" of the composition.

Thus, a high molecular weight catalyst and a low molecular weight catalyst are determined with reference to each other. One does not know whether a catalyst is a high molecular weight catalyst or a low molecular weight catalyst until after another catalyst is also selected. Therefore, the terms "high molecular weight" and "low molecular weight" used herein when referring to a catalyst are merely relative terms and do not encompass any absolute value with respect to the molecular weight of a polymer. After a pair of catalysts are selected, one can easily ascertain the high molecular weight catalyst by the following procedure: 1) select at least one monomer which can be polymerized by the chosen catalysts; 2) make a polymer from the selected monomer(s) in a single reactor containing one of the selected catalysts under pre-selected polymerization conditions; 3) make another polymer from the same monomer(s) in a single reactor containing the other catalyst under substantially the same polymerization conditions; and 4) measure the molecular weight of the respective interpolymers. The catalyst that yields a higher Mw is the higher molecular weight catalyst. Conversely, the catalyst that yields a lower Mw is the lower molecular weight catalyst. Using this methodology, it is possible to rank a plurality of catalysts based on the molecular weight of the polymers they can produce under substantially the same conditions. As such, one may select three, four, five, six, or more catalysts according their molecular weight capability and use these catalysts simultaneously in a single polymerization reactor to produce polymers with tailored structures and properties.

Comonomer incorporation can be measured by many techniques that are known in the art. One technique which may be employed is $^{13}C$ NMR spectroscopy, an example of which is described for the determination of comonomer content for ethylene/alpha-olefin copolymers in Randall (Journal of Macromolecular Science, Reviews in Macromolecular Chemistry and Physics, C29 (2 & 3), 201-317 (1989)), the disclosure of which is incorporated herein by reference. The basic procedure for determining the comonomer content of an olefin interpolymer involves obtaining the $^{13}C$ NMR spectrum under conditions where the intensity of the peaks corresponding to the different carbons in the sample is directly proportional to the total number of contributing nuclei in the sample. Methods for ensuring this proportionality are known in the art and involve allowance for sufficient time for relaxation after a pulse, the use of gated-decoupling techniques, relaxation agents, and the like. The relative intensity of a peak or group of peaks is obtained in practice from its computer-generated integral. After obtaining the spectrum and integrating the peaks, those peaks associated with the comonomer are assigned. This assignment can be made by reference to known spectra or literature, or by synthesis and analysis of model compounds, or by the use of isotopically labeled comonomer. The mole % comonomer can be determined by the ratio of the integrals corresponding to the number of moles of comonomer to the integrals corresponding to the number of moles of all of the monomers in the interpolymer, as described in Randall, for example.

The reactivity ratios of single site catalysts in general are obtained by known methods, for example, as described in "Linear Method for Determining Monomer Reactivity Ratios in Copolymerization", M. Fineman and S. D. Ross, J. Polymer Science 5, 259 (1950) or "Copolymerization", F. R. Mayo and C. Walling, Chem. Rev. 46, 191 (1950) incorporated herein in their entirety by reference. For example, to determine reactivity ratios the most widely used copolymerization model is based on the following equations:

  (1)

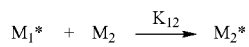  (2)

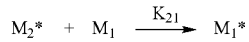  (3)

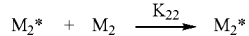  (4)

where $M_i$ refers to a monomer molecule which is arbitrarily designated as "i" where i=1, 2; and $M_2^*$ refers to a growing polymer chain to which monomer i has most recently attached.

The $k_{ij}$ values are the rate constants for the indicated reactions. For example, in ethylene/propylene copolymerization, $k_{11}$ represents the rate at which an ethylene unit inserts into a growing polymer chain in which the previously inserted monomer unit was also ethylene. The reactivity ratios follow as: $r_1=k_{11}/k_{12}$ and $r_2=k_{22}/k_{21}$ wherein $k_{11}$, $k_{12}$, $k_{22}$ and $k_{21}$ are the rate constants for ethylene (1) or propylene (2) addition to a catalyst site where the last polymerized monomer is an ethylene ($k_{1X}$) or propylene ($k_{2X}$).

Because the change in $r_1$ with temperature may vary from catalyst to catalyst, it should be appreciated that the term "different comonomer incorporation" refers to catalysts which are compared at the same or substantially the same polymerization conditions, especially with regard to polymerization temperature. Thus, a pair of catalysts may not possess "different comonomer incorporation" at a low polymerization temperature, but may possess "different comonomer incorporation" at a higher temperature, and visa versa. For the purposes of this invention, "different comonomer incorporation" refers to catalysts, which are compared at the same or substantially the same polymerization temperature. Because it is also known that different cocatalysts or activators can have an effect on the amount of comonomer incorporation in an olefin copolymerization, it should be appreciated that "different comonomer incorporation" refers to catalysts which are compared using the same or substantially the same cocatalyst(s) or activator(s). Thus, for the purposes of this invention, a test to determine whether or not two or more catalysts have "different comonomer incorporation" should be conducted with each catalyst using the same method of activation for each catalyst, and the test should be conducted at the same polymerization temperature, pressure, and monomer content (including comonomer concentration) as is used in the instant inventive process when the individual catalysts are used together.

When a low molecular weight catalyst with $r_1^L$ and a high molecular weight catalyst with $r_1^H$ are selected, the $r_1$ ratio, $r_1^H/r_1^L$, is another way to define the amount of comonomer incorporation by the low and high molecular weight catalysts. The ratio, $r_1^H/r_1^L$, preferably falls between about 0.03 to about 30, more preferably between about 0.05 to about 20, and most preferably between about 0.1 to about 10. Conventional wisdom would cause some to surmise that an interpolymer made from catalysts pairs possessing a $r_1^H/r_1^L$ ratio less than unity might impart adhesive properties substantially better than an interpolymer where that ratio is greater than 1. We have found that excellent adhesive performance can be obtained with interpolymers of the invention that fall into either category. See performance data reported in Table 5 for adhesive formulations made from the ten examples of interpolymers prepared as recorded in Table 3. That data suggests that formulations based on Polymer numbers 1-4 and 8 made from catalyst pairs having a $r_1^H/r_1^L$ ratio of greater than unity, surprisingly exhibit equally good adhesive properties when compared to formulations based on Polymer numbers 5-7, 9 and 10 which were made with catalyst pairs having a $r_1^H/r_1^L$ ratio less than unity.

Generally, a lower $r_1$ indicates a higher comonomer incorporation ability for the catalyst. Conversely, a higher $r_1$ generally indicates a lower comonomer incorporation ability for the catalyst (i.e., a higher reactivity toward ethylene than comonomer and hence a tendency to make an ethylene homopolymer). Therefore, if one desires to make a copolymer with a minimal density split, it would be preferable to use at least two catalysts with substantially similar or identical $r_1$, on the other hand, when one desires to make a blend of homopolymers and copolymers with a significant density split, it would be preferable to employ at least two catalysts with substantially dissimilar $r_1$.

The high molecular weight catalysts and the low molecular weight catalysts may be selected such that they have the ability to incorporate a different amount of comonomers in the polymer. In other words, under substantially the same conditions of temperature, pressure, and monomer content (including comonomer concentration), each catalyst incorporates a different mole percentage of comonomers into the resulting interpolymer. One way to quantify "different" mole percentage of comonomers is as follows: where a difference between the comonomer incorporation of the first catalyst and second catalyst of at least a 10 percent delta exists; e.g., for a first catalyst that incorporates 20 mole % comomoner a second catalyst will incorporate 18 or less mole % or 22 or greater mole % of the comonomer.

Preferably, for all of the ethylene homopolymers and interpolymers described immediately above, at least two of the catalysts used in a single reactor have different comonomer incorporation, and the process used is a gas phase, slurry, or solution process. More preferably, for all of the ethylene homopolymers and interpolymers described immediately above, at least two of the catalysts used in a single reactor have different comonomer incorporation, and $M_w^H/M_w^L$ is from about 1 to about 20, preferably from about 1.5 to about 15, more preferably from about 2 to about 10.

Preferably, the process used is a continuous solution process, especially a continuous solution process wherein the polymer concentration in the reactor at steady state is at least 10% by weight of the reactor contents and the ethylene concentration is 3.5% or less by weight of the reactor contents.

Still more preferably, the process used is a continuous solution process wherein the polymer concentration in the reactor at steady state is at least 18% by weight of the reactor contents and the ethylene concentration is 2.5% or less by weight of the reactor contents.

Most preferably, for all of the ethylene homopolymers and interpolymers described immediately above, at least two of the catalysts used in a single reactor have a different comonomer incorporation, and the process used is a continuous solution process wherein the polymer concentration in the reactor at steady state is at least 20% by weight of the reactor contents and the ethylene concentration is 2.0% or less by weight of the reactor contents.

The catalysts used in the process of the present invention when used individually produce homogeneous ethylene/α-olefin interpolymers. The term "homogeneous interpolymer" is used herein to indicate a linear or substantially linear ethylene interpolymer prepared using a constrained geometry or single site metallocene catalyst. By the term homogeneous, it is meant that any comonomer is randomly distributed within a given interpolymer molecule and substantially all of the interpolymer molecules have the same ethylene/comonomer ratio within that interpolymer. The melting peak of homogeneous linear and substantially linear ethylene polymers, as determined by differential scanning calorimetry (DSC), will broaden as the density decreases and/or as the number average molecular weight decreases.

The homogeneous linear or substantially linear ethylene polymers are characterized as having a narrow molecular weight distribution (Mw/Mn). For the linear and substantially linear ethylene polymers, the Mw/Mn is preferably about 1.5 or greater, preferably about 1.8 or greater to about 2.6 or less, preferably to about 2.4 or less.

Certain interpolymer compositions of the present invention when produced using multiple single site catalysts may, depending upon the relative contributions of each catalyst-derived product, exhibit much larger values. In such case, the molecular weight distribution (Mw/Mn) values may be from about 2 up to about 20, preferably up to about 15 and more preferably up to about 12.

Homogeneously branched linear ethylene/α-olefin interpolymers may be prepared using polymerization processes (such as is described by Elston in U.S. Pat. No. 3,645,992) which provide a homogeneous short chain branching distribution. In his polymerization process, Elston uses soluble vanadium catalyst systems to make such polymers. However, others such as Mitsui Petrochemical Company and Exxon Chemical Company have used so-called single site metallocene catalyst systems to make polymers having a homogeneous linear structure. Homogeneous linear ethylene/α-olefin interpolymers are currently available from Mitsui Petrochemical Company under the tradename "TAFMER™" and from Exxon Chemical Company under the tradename "EXACT™".

Substantially linear ethylene polymers are homogeneous polymers having long chain branching. The long chain branches have the same comonomer distribution as the polymer backbone and can be as long as about the same length as the length of the polymer backbone. When a substantially linear ethylene polymer is employed in the practice of the invention, such polymer may be characterized as having a polymer backbone substituted with from 0.01 to 3 long chain branches per 1,000 carbons.

For quantitative methods for determination, see, for instance, U.S. Pat. Nos. 5,272,236 and 5,278,272; Randall (Rev. Macromol. Chem. Phys., C29 (2 &3), p. 285-297), which discusses the measurement of long chain branching using 13C nuclear magnetic resonance spectroscopy, Zimm, G. H. and Stockmayer, W. H., J. Chem. Phys., 17, 1301 (1949); and Rudin, A., Modern Methods of Polymer Characterization, John Wiley & Sons, New York (1991) pp. 103-112, which discuss the use of gel permeation chromatography coupled with a low angle laser light scattering detector (GPC-LALLS) and gel permeation chromatography coupled with a differential viscometer detector (GPC-DV).

Most preferred are interpolymers of ethylene with at least one $C_3$-$C_{30}$ α-olefin, (for instance, propylene, 1-butene, 1-pentene, 1-hexene, 4-methyl-1-pentene, and 1-octene), with interpolymers of ethylene with at least one $C_4$-$C_{20}$ α-olefin, particularly at least one $C_6$-$C_{10}$ α-olefin, being most preferred. Another preferred class of interpolymers of ethylene are those prepared with at least one comonomer being styrene.

Substantially linear ethylene/α-olefin interpolymers are available from The Dow Chemical Company as AFFINITY™ polyolefin plastomers. Substantially linear ethylene/alpha-olefin interpolymers may be prepared in accordance with the techniques described in U.S. Pat. No. 5,272,236 and in U.S. Pat. No. 5,278,272, the entire contents of both of which are herein incorporated by reference.

The present invention is a polymer composition, derived from ethylene and alpha olefin, which can be used as an alternative to conventional hot melt adhesives that are subsequently used to bond articles, yet which composition yields adhesive properties similar to adhesives containing polymer, wax and tackifier.

The present invention has discovered that use of a specific type of homogeneous interpolymer can unexpectedly be used by itself or in combination with a tackifier to produce commercially acceptable hot melt adhesives. The present invention is a hot melt adhesive comprising a specific synthetic interpolymer that, when combined with a suitable tackifier, can be used as an alternative to hot melt adhesive formulations that incorporate a three-component wax, polymer and tackifier mixture.

The homogenous interpolymer of the present invention may be prepared using a mixture of the constrained geometry catalysts. Such catalysts are disclosed in U.S. Pat. Nos. 5,064,802, 5,132,380, 5,703,187, 6,034,021, EP 0 468 651, EP 0 514 828, WO 93/19104, and WO 95/00526, all of which are incorporated by references herein in their entirety. Another suitable class of catalysts is the metallocene catalysts disclosed in U.S. Pat. Nos. 5,044,438; 5,057,475; 5,096,867; and 5,324,800, all of which are incorporated by reference herein in their entirety. It is noted that constrained geometry catalysts may be considered as metallocene catalysts, and both are sometimes referred to in the art as single-site catalysts.

For example, catalysts may be selected from the metal coordination complexes corresponding to the formula:

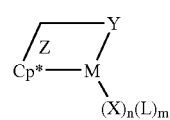

Formula I wherein: M is a metal of group 3, 4-10, or the lanthanide series of the periodic table of the elements; Cp* is a cyclopentadienyl or substituted cyclopentadienyl group bound in an $\eta^5$ bonding mode to M; Z is a moiety comprising boron, or a member of group 14 of the periodic table of the elements, and optionally sulfur or oxygen, the moiety having up to 40 non-hydrogen atoms, and optionally Cp* and Z together form a fused ring system; X independently each occurrence is an anionic ligand group, said X having up to 30 non-hydrogen atoms; n is 2 less than the valence of M when Y is anionic, or 1 less than the valence of M when Y is neutral; L independently each occurrence is a neutral Lewis base ligand group, said L having up to 30 non-hydrogen atoms; m is 0, 1, 2, 3, or 4; and Y is an anionic or neutral ligand group bonded to Z and M comprising nitrogen, phosphorus, oxygen or sulfur and having up to 40 non-hydrogen atoms, optionally Y and Z together form a fused ring system.

Suitable catalysts may also be selected from the metal coordination complex corresponds to the formula:

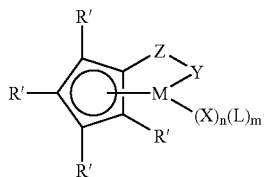

Formula II wherein R' each occurrence is independently selected from the group consisting of hydrogen, alkyl, aryl, silyl, germyl, cyano, halo and combinations thereof having up to 20 non-hydrogen atoms; X each occurrence independently is selected from the group consisting of hydride, halo, alkyl, aryl, silyl, germyl, aryloxy, alkoxy, amide, siloxy, and combinations thereof having up to 20 non-hydrogen atoms; L independently each occurrence is a neutral Lewis base ligand having up to 30 non-hydrogen atoms; Y is $-O-$, $-S-$, $-NR^*-$, $-PR^*-$, or a neutral two electron donor ligand selected from the group consisting of $OR^*$, $SR^*$, $NR^*_2$, $PR^*_2$; M, n, and m are as previously defined; and Z is $SIR^*_2$, $CR^*_2$, $SiR^*_2SiR^*_2$, $CR^*_2CR^*_2$, $CR^*=CR^*$, $CR^*_2SiR^*_2$, $GeR^*_2$, $BR^*$, $BR^*_2$; wherein: $R^*$ each occurrence is independently selected from the group consisting of hydrogen, alkyl, aryl, silyl, halogenated alkyl, halogenated aryl groups having up to 20 non-hydrogen atoms, and mixtures thereof, or two or more $R^*$ groups from Y, Z, or both Y and Z form a fused ring system.

It should be noted that whereas formula I and the following formulae indicate a monomeric structure for the catalysts, the complex may exist as a dimer or higher oligomer.

Further preferably, at least one of R', Z, or $R^*$ is an electron donating moiety. Thus, highly preferably Y is a nitrogen or phosphorus containing group corresponding to the formula $-N(R'''')-$ or $-P(R'''')-$, wherein R'''' is $C_{1-10}$ alkyl or aryl, i.e., an amido or phosphido group.

Additional catalysts may be selected from the amidosilane- or amidoalkanediyl-compounds corresponding to the formula:

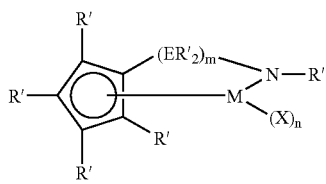

Formula III wherein: M is titanium, zirconium or hafnium, bound in an $\eta^5$ bonding mode to the cyclopentadienyl group; R' each occurrence is independently selected from the group consisting of hydrogen, silyl, alkyl, aryl and combinations thereof having up to 10 carbon or silicon atoms; E is silicon or carbon; X independently each occurrence is hydride, halo, alkyl, aryl, aryloxy or alkoxy of up to 10 carbons; m is 1 or 2; and n is 1 or 2 depending on the valence of M.

Examples of the above metal coordination compounds include, but are not limited to, compounds in which the R' on the amido group is methyl, ethyl, propyl, butyl, pentyl, hexyl, (including isomers), norbornyl, benzyl, phenyl, etc.; the cyclopentadienyl group is cyclopentadienyl, indenyl, tetrahydroindenyl, fluorenyl, octahydrofluorenyl, etc.; R' on the foregoing cyclopentadienyl groups each occurrence is hydrogen, methyl, ethyl, propyl, butyl, pentyl, hexyl, (including isomers), norbornyl, benzyl, phenyl, etc.; and X is chloro, bromo, iodo, methyl, ethyl, propyl, butyl, pentyl, hexyl, (including isomers), norbornyl, benzyl, phenyl, etc.

Specific compounds include, but are not limited to, (tert-butylamido)(tetramethyl-$\eta^5$-cyclopentadienyl)-1,2-ethanediylzirconium dimethyl, (tert-butylamido)(tetramethyl-$\eta^5$-cyclopentadienyl)-1,2-ethanediyltitanium dimethyl, (methylamido)(tetramethyl-$\eta^5$-cyclopentadienyl)-1,2-ethanediylzirconium dichloride, (methylamido)(tetramethyl-$\eta^5$-eyelopentadienyl)-1,2-ethanediyltitanium dichloride, (ethylamido)(tetramethyl-$\eta^5$-cyclopentadienyl) methylenetitanium dichloride, (tertbutylamido)diphenyl (tetramethyl-$\eta^5$-cyclopentadienyl)silanezirconium dibenzyl, (benzylamido)dimethyl(tetramethyl-$\eta^5$-cyclopentadienyl) silanetitaniumdichloride, phenylphosphido)dimethyl(tetramethyl-$\eta^5$-cyclopentadienyl)silanezirconium dibenzyl, and the like.

Another suitable class of catalysts is substituted indenyl containing metal complexes as disclosed in U.S. Pat. Nos. 5,965,756 and 6,015,868, which are incorporated by reference in their entirety. Other catalysts are disclosed in copending applications U.S. Pat. Nos. 6,268,444; 6,515,155; 6,613, 921 and WO 01/042315A1. The disclosures of all of the preceding patent applications or publications are incorporated by reference in their entirety. These catalysts tend to have a higher molecular weight capability.

One class of the above catalysts is the indenyl containing metal wherein:

Formula IV

M is titanium, zirconium or hafnium in the +2, +3 or +4 formal oxidation state;

A' is a substituted indenyl group substituted in at least the 2 or 3 position with a group selected from hydrocarbyl, fluoro-substituted hydrocarbyl, hydrocarbyloxy-substituted hydrocarbyl, dialkylamino-substituted hydrocarbyl, silyl, germyl and mixtures thereof, the group containing up to 40 non-hydrogen atoms, and the A' further being covalently bonded to M by means of a divalent Z group; Z is a divalent moiety bound to both A' and M via σ-bonds, the Z comprising boron, or a member of Group 14 of the Periodic Table of the Elements, and also comprising nitrogen, phosphorus, sulfur or oxygen; X is an anionic or dianionic ligand group having up to 60 atoms exclusive of the class of ligands that are cyclic, delocalized, π-bound ligand groups; X' independently each occurrence is a neutral Lewis base, having up to 20 atoms; p is 0, 1 or 2, and is two less than the formal oxidation state of M, with the proviso that when X is a dianionic ligand group, p is 1; and q is 0, 1 or 2.

The above complexes may exist as isolated crystals optionally in pure form or as a mixture with other complexes, in the form of a solvated adduct, optionally in a solvent, especially an organic liquid, as well as in the form of a dimer or chelated derivative thereof, wherein the chelating agent is an organic material, preferably a neutral Lewis base, especially a trihydrocarbylamine, trihydrocarbylphosphine, or halogenated derivative thereof.

Other preferred catalysts are complexes corresponding to the formula:

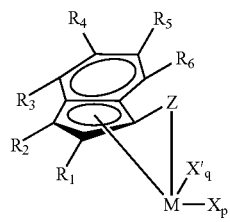

Formula V wherein $R_1$ and $R_2$ independently are groups selected from hydrogen, hydrocarbyl, perfluoro substituted hydrocarbyl, silyl, germyl and mixtures thereof, the group containing up to 20 non-hydrogen atoms, with the proviso that at least one of $R_1$ or $R_2$ is not hydrogen; $R_3$, $R_4$, $R_5$, and $R_6$ independently are groups selected from hydrogen, hydrocarbyl, perfluoro substituted hydrocarbyl, silyl, germyl and mixtures thereof, the group containing up to 20 non-hydrogen atoms; M is titanium, zirconium or hafnium; Z is a divalent moiety comprising boron, or a member of Group 14 of the Periodic Table of the Elements, and also comprising nitrogen, phosphorus, sulfur or oxygen, the moiety having up to 60 non-hydrogen atoms; p is 0, 1 or 2; q is zero or one; with the proviso that: when p is 2, q is zero, M is in the +4 formal oxidation state, and X is an anionic ligand selected from the group consisting of halide, hydrocarbyl, hydrocarbyloxy, di(hydrocarbyl) amido, di(hydrocarbyl)phosphido, hydrocarbyl sulfido, and silyl groups, as well as halo-, di(hydrocarbyl)amino-, hydrocarbyloxy- and di(hydrocarbyl)phosphino-substituted derivatives thereof, the X group having up to 20 non-hydrogen atoms, when p is 1, q is zero, M is in the +3 formal oxidation state, and X is a stabilizing anionic ligand group selected from the group consisting of allyl, 2-(N,N-dimethylaminoethyl)phenyl, and 2-(N,N-dimethyl)-aminobenzyl, or M is in the +4 formal oxidation state, and X is a divalent derivative of a conjugated diene, M and X together forming a metallocyclopentene group, and when p is 0, q is 1, M is in the +2 formal oxidation state, and X' is a neutral, conjugated or non-conjugated diene, optionally substituted with one or more hydrocarbyl groups, the X' having up to 40 carbon atoms and forming a π-complex with M.

More preferred catalysts are complexes corresponding to the formula:

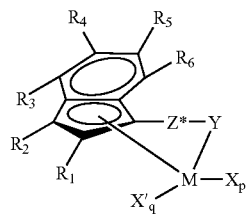

Formula VI wherein: $R_1$ and $R_2$ are hydrogen or $C_{1-6}$ alkyl, with the proviso that at least one of $R_1$ or $R_2$ is not hydrogen; $R_3$, $R_4$, $R_5$, and $R_6$ independently are hydrogen or $C_{1-6}$ alkyl; M is titanium; Y is —O—, —S—, —NR*—, —PR*—; Z* is SiR*$_2$, CR*$_2$, SiR*$_2$SiR*$_2$, CR*$_2$CR*$_2$, CR*=CR*, CR*$_2$SiR*$_2$, or GeR*$_2$; R* each occurrence is independently hydrogen, or a member selected from hydrocarbyl, hydrocarbyloxy, silyl, halogenated alkyl, halogenated aryl, and combinations thereof, the R* having up to 20 non-hydrogen atoms, and optionally, two R* groups from Z (when R* is not hydrogen), or an R* group from Z and an R* group from Y form a ring system; p is 0, 1 or 2; q is zero or one; with the proviso that: when p is 2, q is zero, M is in the +4 formal oxidation state, and X is independently each occurrence methyl or benzyl, when p is 1, q is zero, M is in the +3 formal oxidation state, and X is 2-(N,N-dimethyl)aminobenzyl; or M is in the +4 formal oxidation state and X is 1,4-butadienyl, and when p is 0, q is 1, M is in the +2 formal oxidation state, and X' is 1,4-diphenyl-1,3-butadiene or 1,3-pentadiene. The latter diene is illustrative of unsymmetrical diene groups that result in production of metal complexes that are actually mixtures of the respective geometrical isomers.

Other catalysts, cocatalysts, catalyst systems, and activating techniques which may be used in the practice of the invention disclosed herein may include those disclosed in; U.S. Pat. No. 5,616,664, WO 96/23010, published on Aug. 1, 1996, WO 99/14250, published Mar. 25, 1999, WO 98/41529, published Sep. 24, 1998, WO 97/42241, published Nov. 13, 1997, WO 97/42241, published Nov. 13, 1997, those disclosed by Scollard, et al., in J. Am. Chem. Soc 1996, 118, 10008-10009, EP 0 468 537 B1, published Nov. 13, 1996, WO 97/22635, published Jun. 26, 1997, EP 0 949 278 A2, published Oct. 13, 1999; EP 0 949 279 A2, published Oct. 13, 1999; EP 1 063 244 A2, published Dec. 27, 2000; U.S. Pat. Nos. 5,408,017; 5,767,208; 5,907,021; WO 88/05792, published Aug. 11, 1988; WO88/05793, published Aug. 11, 1988; WO 93/25590, published Dec. 23, 1993;U.S. Pat. Nos. 5,599,761; 5,218,071; WO 90/07526, published Jul. 12, 1990; U.S. Pat. Nos. 5,972,822; 6,074,977; 6,013,819; 5,296, 433; 4,874,880; 5,198,401; 5,621,127; 5,703,257; 5,728,855; 5,731,235; 5,710,224; 5,883,204; 5,504,049; 5,962,714; 6,150,297, 5,965,677; 5,427,991; WO 93/21238, published Oct. 28, 1993; WO 94/03506, published Feb. 17, 1994; WO 93/21242, published Oct. 28, 1993; WO 94/00500, published Jan. 6, 1994, WO 96/00244, published Jan. 4, 1996, WO 98/50392, published Nov. 12, 1998; Wang, et al., Organometallics 1998, 17, 3149-3151; Younkin, et al., Science 2000, 287, 460-462, Chen and Marks, Chem. Rev. 2000, 100, 1391-1434, Alt and Koppl, Chem. Rev. 2000, 100, 1205-1221; Resconi, et al., Chem. Rev. 2000, 100, 1253-1345; Ittel, et al., ChemRev. 2000, 100, 1169-1203; Coates, Chem. Rev., 2000, 100, 1223-1251; WO 96/13530, published May 9, 1996; all of which patents and publications are herein incorporated by reference in their entirety. Also useful are those catalysts, cocatalysts, and catalyst systems disclosed in U.S. Pat. Nos. 5,965,756; 6,150,297; and publications U.S. Pat. Nos. 6,268, 444 and 6,515,155; all of which patents and publications are incorporated by reference in their entirety. In addition, methods for preparing the aforementioned catalysts are described, for example, in U.S. Pat. No. 6,015,868, the entire content of which is incorporated by reference.

Cocatalysts:

The above-described catalysts may be rendered catalytically active by combination with an activating cocatalyst or by use of an activating technique. Suitable activating cocatalysts for use herein include, but are not limited to, polymeric or oligomeric alumoxanes, especially methylalumoxane, triisobutylaluminum modified methylalumoxane, or isobutylalumoxane; neutral Lewis acids, such as $C_{1-30}$ hydrocarbyl substituted Group 13 compounds, especially tri(hydrocarbyl) aluminum or tri(hydrocarbyl)boron compounds and halogenated (including perhalogenated) derivatives thereof, having from 1 to 30 carbons in each hydrocarbyl or halogenated hydrocarbyl group, more especially perfluorinated tri(aryl) boron and perfluorinated tri(aryl)aluminum compounds, mixtures of fluoro-substituted(aryl)boron compounds with alkyl-containing aluminum compounds, especially mixtures of tris(pentafluorophenyl)borane with trialkylaluminum or mixtures of tris(pentafluorophenyl)borane with alkylalumoxanes, more especially mixtures of tris(pentafluorophenyl)borane with methylalumoxane and mixtures of tris(pentafluorophenyl)borane with methylalumoxane modified with a percentage of higher alkyl groups (MMAO), and most especially tris(pentafluorophenyl)borane and tris(pentafluorophenyl)aluminum; non-polymeric, compatible, non-coordinating, ion forming compounds (including the use of such compounds under oxidizing conditions), especially the use of ammonium-, phosphonium-, oxonium-, carbonium-, silylium- or sulfonium-salts of compatible, non-coordinating anions, or ferrocenium salts of compatible, non-coordinating anions; bulk electrolysis and combinations of the foregoing activating cocatalysts and techniques. The foregoing activating cocatalysts and activating techniques have been previously taught with respect to different metal complexes in the following references: EP-A-277,003, U.S. Pat. No. 5,153, 157, 5,064,802, EP-A468,651 (equivalent to U.S. Ser. No. 07/547,718), EP-A-520,732 (equivalent to U.S. Ser. No. 07/876,268), and EP-A-520,732 (equivalent to U.S. Ser. Nos. 07/884,966 filed May 1, 1992). The disclosures of the all of the preceding patents or patent applications are incorporated by reference in their entirety.

Combinations of neutral Lewis acids, especially the combination of a triallyl aluminum compound having from 1 to 4 carbons in each alkyl group and a halogenated tri(hydrocarbyl)boron compound having from 1 to 20 carbons in each hydrocarbyl group, especially tris(pentafluorophenyl)borane, further combinations of such neutral Lewis acid mixtures with a polymeric or oligomeric alumoxane, and combinations of a single neutral Lewis acid, especially tris (pentafluorophenyl)borane with a polymeric or oligomeric alumoxane are especially desirable activating cocatalysts. It has been observed that the most efficient catalyst activation using such a combination of tris(pentafluoro-phenyl)borane/ alumoxane mixture occurs at reduced levels of alumoxane. Preferred molar ratios of Group 4 metal complex:tris(pentafluoro-phenylborane:alumoxane are from 1:1:1 to 1:5:10, more preferably from 1:1:1 to 1:3:5. Such efficient use of lower levels of alumoxane allows for the production of olefin polymers with high catalytic efficiencies using less of the expensive alumoxane cocatalyst. Additionally, polymers with lower levels of aluminum residue, and hence greater clarity, are obtained.

Suitable ion forming compounds useful as cocatalysts in some embodiments of the invention comprise a cation which is a Brø nsted acid capable of donating a proton, and a compatible, non-coordinating anion, A⁻. As used herein, the term "non-coordinating" means an anion or substance which either does not coordinate to the Group 4 metal containing precursor complex and the catalytic derivative derived therefrom, or which is only weakly coordinated to such complexes thereby remaining sufficiently labile to be displaced by a neutral Lewis base. A non-coordinating anion specifically refers to an anion which, when functioning as a charge balancing anion in a cationic metal complex, does not transfer an anionic substituent or fragment thereof to the cation thereby forming neutral complexes during the time which would substantially interfere with the intended use of the cationic metal complex as a catalyst. "Compatible anions" are anions which are not degraded to neutrality when the initially formed complex decomposes and are non-interfering with desired subsequent polymerization or other uses of the complex.

Preferred anions are those containing a single coordination complex comprising a charge-bearing metal or metalloid core which anion is capable of balancing the charge of the active catalyst species (the metal cation) which may be formed when the two components are combined. Also, the anion should be sufficiently labile to be displaced by olefinic, diolefinic and acetylenically unsaturated compounds or other neutral Lewis bases such as ethers or nitrites. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are, of course, known in the art and many, particularly such compounds containing a single boron atom in the anion portion, are available commercially.

Preferably such cocatalysts may be represented by the following general formula:

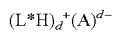      Formula VII wherein L* is a neutral Lewis base; (L*-H)+ is a Bronsted acid; $A^{d-}$ is an anion having a charge of d−, and d is an integer from 1 to 3. More preferably $A^{d-}$ corresponds to the formula: $[M'Q_4]^-$; wherein M' is boron or aluminum in the +3 formal oxidation state; and Q independently each occurrence is selected from hydride, dialkylamido, halide, hydrocarbyl, hydrocarbyloxy, halosubstituted-hydrocarbyl, halosubstituted hydrocarbyloxy, and halo-substituted silylhydrocarbyl radicals (including perhalogenated hydrocarbyl-, perhalogenated hydrocarbyloxy- and perhalogenated silylhydrocarbyl radicals), the Q having up to 20 carbons with the proviso that in not more than one occurrence is Q halide. Examples of suitable hydrocarbyloxy Q groups are disclosed in U.S. Pat. No. 5,296,433.

In a more preferred embodiment, d is one, that is, the counter ion has a single negative charge and is A⁻. Activating cocatalysts comprising boron which are particularly useful in the preparation of catalysts of this invention may be represented by the following general formula:

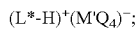      Formula VIII wherein L* is as previously defined; M' is boron or aluminum in a formal oxidation state of 3; and Q is a hydrocarbyl-, hydrocarbyloxy-, fluorinated hydrocarbyl-, fluorinated hydrocarbyloxy-, or fluorinated silylhydrocarbyl-group of up to 20 non-hydrogen atoms, with the proviso that in not more than one occasion is Q hydrocarbyl. Most preferably, Q in each occurrence is a fluorinated aryl group, especially a pentafluorophenyl group. Preferred (L*-H)⁺ cations are N,N-dimethylanilinium, N,N-di(octadecyl)anilinium, di(octadecyl)methylammonium, methylbis(hydrogenated tallowyl) ammonium, and tributylammonium.

Illustrative, but not limiting, examples of boron compounds which may be used as an activating cocatalyst are tri-substituted ammonium salts such as: trimethylammonium tetrakis(pentafluorophenyl)borate; triethylammonium tetrakis(pentafluorophenyl)borate; tripropylammonium tetrakis (pentafluorophenyl)borate; tri(n-butyl)ammonium tetrakis (pentafluorophenyl)borate; tri(sec-butyl)ammonium tetrakispentafluorophenyl)-borate; N,N-dimethylanilinium tetrakis(pentafluorophenyl)borate; N,N-dimethylanilinium n-butyltris(pentafluorophenyl)borate; N,N-dimethylanilinium benzyltris(pentafluorophenyl)borate; N,N-dimethylanilinium tetrakis(4-(t-butyldimethylsilyl)-2,3,5,6-tetrafluorophenyl)borate; N,N-dimethylanilinium tetrakis(4-(triisopropylsilyl)-2,3,5,6-tetrafluorophenyl)borate; N,N-dimethylanilinium pentafluorophenoxytris (pentafluorophenyl)borate; N,N-diethylanilinium tetrakis (pentafluorophenyl)borate; N,N-dimethyl-2,4,6-trimethylanilinium tetrakis(pentafluorophenyl)borate; trimethylammonium tetrakis(2,3,4,6-tetrafluorophenyl)borate; triethylammonium tetrakis(2,3,4,6-tetrafluorophenyl) borate; tripropylammonium tetrakis(2,3,4,6-tetrafluorophenyl)borate; tri(n-butyl)ammonium tetrakis(2,3,4,6-tetrafluorophenyl)borate; dimethyl(t-butyl)ammonium tetrakis(2,3,4,6-tetra fluorophenyl)borate; N,N-dimethylanilinium tetrakis(2,3,4,6-tetrafluorophenyl) -borate; N,N-diethylanilinium tetrakis (2,3,4,6-tetrafluorophenyl)borate; and N,N-dimethyl-2,4,6-trimethylanilinium tetrakis(2,3,4,6-tetrafluorophenyl)borate; dialkyl ammonium salts such as: di-(i-propyl)ammonium tetrakis(pentafluorophenyl)borate; and dicyclohexylammonium tetrakis(pentafluorophenyl)borate; tri-substituted phosphonium salts such as: triphenylphosphonium tetrakis(pentafluorophenyl)borate; tri(o-tolyl)phosphonium tetrakis(pentafluorophenyl)borate; and tri(2,6-dimethylphenyl)-phosphonium tetrakis(pentafluorophenyl)borate; di-substituted oxonium salts such as: diphenyloxonium tetrakis(pentafluorophenyl)borate; di(o-tolyl) oxonium tetrakis (pentafluorophenyl)borate; and di(2, 6dimethylphenyl)oxonium tetrakis(pentafluorophenyl) borate; di-substituted sulfonium salts such as: diphenylsulfonium tetrakis(pentafluorophenyl)borate; di(o-tolyl)sulfonium tetrakis(pentafluorophenyl)borate; and bis (2,6-dimethylphenyl)sulfonium tetrakis(pentafluorophenyl) borate.

Preferred silylium salt activating cocatalysts include, but are not limited to, trimethylsilylium tetrakispentafluorophenylborate, triethylsilylium tetrakispentafluoro-phenylborate and ether substituted adducts thereof. Silylium salts have been previously generically disclosed in J. Chem. Soc. Chem. Comm., 1993, 383-384, as well as Lambert, J. B., et al., Organometallics, 1994, 13, 2430-2443. The use of the above silylium salts as activating cocatalysts for addition polymerization catalysts is disclosed in U.S. Pat. No. 5,625,087, which is incorporated by reference herein in its entirety. Certain complexes of alcohols, mercaptans, silanols, and oximes with tris(pentafluorophenyl)borane are also effective catalyst activators and may be used in embodiments of the invention. Such cocatalysts are disclosed in U.S. Pat. No. 5,296,433, which is also incorporated by reference in its entirety.

The catalyst system may be prepared as a homogeneous catalyst by addition of the requisite components to a solvent in which polymerization will be carried out by solution polymerization procedures. The catalyst system may also be prepared and employed as a heterogeneous catalyst by adsorbing the requisite components on a catalyst support material such as silica gel, alumina or other suitable inorganic support material. When prepared in heterogeneous or supported form, it is preferred to use silica as the support material.

At all times, the individual ingredients, as well as the catalyst components, should be protected from oxygen and moisture. Therefore, the catalyst components and catalysts should be prepared and recovered in an oxygen and moisture free atmosphere. Preferably, therefore, the reactions are performed in the presence of a dry, inert gas such as, for example, nitrogen or argon.

The molar ratio of metal complex: activating cocatalyst employed preferably ranges from 1:1000 to 2:1, more preferably from 1:5 to 1.5:1, most preferably from 1:2 to 1:1. In the preferred case in which a metal complex is activated by trispentafluorophenylborane and triisobutylaluminum modified methylalumoxane, the transition metal:boron:aluminum molar ratio is typically from 1:10:50 to 1:0.5:0.1, and most typically from about 1:3:5.

In general, the polymerization may be accomplished at conditions for Ziegler-Natta or metallocene-type polymerization reactions, that is, reactor pressures ranging from atmospheric to 3500 atmospheres (354.6 MPa). The reactor temperature should be greater than 80° C., typically from 100° C. to 250° C., and preferably from 100° C. to 180° C., with higher reactor temperatures, that is, reactor temperatures greater than 100° C. generally favoring the formation of lower molecular weight polymers.

In most polymerization reactions the molar ratio of catalyst:polymerizable compounds employed is from $10^{-12}:1$ to $10^{-1}:1$, more preferably from $10^{-9}:1$ to $10^{-5}:1$.

Solution polymerization conditions utilize a solvent for the respective components of the reaction. Preferred solvents include mineral oils and the various hydrocarbons which are liquid at reaction temperatures. Illustrative examples of useful solvents include allies such as pentane, isopentane, hexane, heptane, octane and nonane, as well as mixtures of alkanes including kerosene and Isopar E™, available from Exxon Chemicals Inc.; cycloalkanes such as cyclopentane and cyclohexane; and aromatics such as benzene, toluene, xylenes, ethylbenzene and diethylbenzene.

The solvent will be present in an amount sufficient to prevent phase separation in the reactor. As the solvent functions to absorb heat, less solvent leads to a less adiabatic reactor. The solvent:ethylene ratio (weight basis) will typically be from 2.5:1 to 12:1, beyond which point catalyst efficiency suffers. The most typical solvent:ethylene ratio (weight basis) is in the range of from 3.5:1 to 7:1.

The polymerization may be carried out as a batchwise or a continuous polymerization process, with continuous polymerizations processes being required for the preparation of substantially linear polymers. In a continuous process, ethylene, comonomer, and optionally solvent and diene are continuously supplied to the reaction zone and polymer product continuously removed therefrom.

Other Additives

The interpolymers of the present invention may also contain a number of additional components, such as a stabilizer, plasticizer, filler or antioxidant. Among the applicable stabilizers or antioxidants which can be included in the adhesive composition of the present invention are high molecular weight hindered phenols and multifunctional phenols, such as sulfur-containing and phosphorous-containing phenols. Hindered phenols, known to those skilled in the art, may be described as phenolic compounds, which also contain sterically bulky radicals in close proximity to the phenolic hydroxyl group. Specifically, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency, and correspondingly, its reactivity. It is this hindrance that provides the stabilizing properties of these phenolic compounds.

Representative hindered phenols include; but are not limited to: 2,4,6-trialkylated monohydroxy phenols; 1,3,5-trimethyl-2,4,6-tris-(3,5-di-tert-butyl-4-hydroxybenzyl)-benzene; pentaerythritol tetrakis-3(3,5-di-tert-butyl-4-hydroxyphenyl)-propionate, commercially available under the trademark IRGANOX® 1010; n-octadecyl-3(3,5-di-tert-butyl-4-hydroxyphenyl)-propionate; 4,4'-methylenebis(4-methyl-6-tert-butyl-phenol); 4,4'-thiobis(6-tert-butyl-o-cresol); 2,6-di-tertbutylphenol; 6-(4-hydroxyphenoxy)-2,4-bis(n-octyl-thio)-1,3,5 triazine; 2-(n-octylthio)ethyl 3,5-tert-butyl-4-hydroxy-benzoate; di-n-octadecyl 3,5-di-tert-butyl-4-hydroxy-benzylphosphonate; and sorbitol hexa(3,3,5-di-tert-butyl-4-hydroxy-phenyl)-propionate.

Antioxidants include, but are not limited to, butylated hydroxy anisole ("BHA") or butylated hydroxy toluene ("BHT") which may also be utilized to render the formulation more thermally stable. These stabilizers and antioxidants are added in amounts ranging approximately 0.01% to approximately 5% by weight of the formulation.

Utilizing known synergists in conjunction with the antioxidants may further enhance the performance of these antioxidants. Some of these known synergists are, for example, thiodipropionate esters and phosphates. Chelating agents and metal deactivators, may also be used. Examples of these compounds include ethylenediaminetetraacetic acid ("EDTA"), and more preferably, its salts, and disalicylalpropylenediamine. Distearylthiodipropionate is particularly useful. When added to the adhesive composition, these stabilizers, if used, are generally present in amounts of about 0.1 to about 1.5 weight percent, and more preferably in the range of about 0.25 to about 1.0 weight percent.

The present invention also contemplates the addition of a polymeric additive to the adhesive. The polymeric additive can be selected from the group consisting of ethylene methyl acrylate polymers containing 10 to 28 weight percent by weight methyl acrylate; ethylene acrylic acid copolymers having an acid number of 25 to 150; polyethylene; polypropylene; poly(butene-1-co-ethylene)polymers and low molecular weight and/or low melt index ethylene n-butyl acrylate copolymers. When such a polymeric additive is added, it is present in amounts up to about 15 weight percent by weight of composition.

Depending on the specific end uses contemplated for formulations of the interpolymers, other additives such as plasticizers, pigments and dyestuffs may be included. A plasticizer may be used in lieu of, or in combination with a secondary tackifier to modify viscosity and improve the tack properties of an adhesive composition.

A dispersant can also be added to these compositions. The dispersant can be a chemical, which may, by itself, cause the composition to be dispersed from the surface to which it has been applied, for example, under aqueous conditions. The dispersant may also be an agent which when chemically modified, causes the composition to be dispersed from the surface to which it has been applied. As known to those skilled in the art, examples of these dispersants include surfactants, emulsifying agents, and various cationic, anionic or nonionic dispersants. Compounds such as amines, amides and their derivatives are examples of cationic dispersants. Soaps, acids, esters and alcohols are among the known anionic dispersants. The addition of a dispersant may affect the recyclability of products to which a hot-melt adhesive may have been applied.

The surfactants can be chosen from a variety of known surface-active agents. These can include nonionic compounds such as ethoxylates available from commercial suppliers. Examples include alcohol ethoxylates, alkylamine ethoxylates, alkylphenol ethyoxylates, octylphenol ethoxylates and the like. Other surfactants, such as a number of fatty acid esters may be employed; for example, but not limited to, glycerol esters, polyethyleneglycol esters and sorbitan esters.

Tackifiers

In order to formulate hot melt adhesives from the polymers of the present invention, the addition of tackifier is desirable to allow for bonding prior to solidifying or setting of the adhesive. An example of this is in high-speed cereal box sealing operations where the overlapping flaps of the box need to adhere to one another while the hot melt adhesive solidifies.

Such tackifying resins include aliphatic, cycloaliphatic and aromatic hydrocarbons and modified hydrocarbons and hydrogenated versions; terpenes and modified terpenes and hydrogenated versions; and rosins and rosin derivatives and hydrogenated versions; and mixtures thereof These tackifying resins have a ring and ball softening point from 70° C. to 150° C., and will typically have a viscosity at 350° F. (177° C.), as measured using a Brookfield viscometer, of no more than 2000 centipoise. They are also available with differing levels of hydrogenation, or saturation, which is another commonly used term. Useful examples include Eastotac™ H-100, H-115, H-130 and H-142 from Eastman Chemical Co. in Kingsport, Tenn., which are partially hydrogenated cycloaliphatic petroleum hydrocarbon resins with softening points of 100° C., 115° C. and 130° C., respectively. These are available in the E grade, the R grade, the L grade and the W grade, indicating differing levels of hydrogenation with E being the least hydrogenated and W being the most hydrogenated. The E grade has a bromine number of 15, the R grade a bromine number of 5, the L grade a bromine number of 3 and the W grade has a bromine number of 1. Eastotac™H-142R from Eastman Chemical Co. has a softening point of about 140° C. Other useful tackifying resins include Escorez™5300, 5400, and 5637, partially hydrogenated aliphatic petroleum hydrocarbon resins, and Escorez™5600, a partially hydrogenated aromatic modified petroleum hydrocarbon resin all available from Exxon Chemical Co. in Houston, Tex.; Wingtack™ Extra, which is an aliphatic, aromatic petroleum hydrocarbon resin available from Goodyear Chemical Co. in Akron, Ohio; Hercolite™ 2100, a partially hydrogenated cycloaliphatic petroleum hydrocarbon resin available from Hercules, Inc. in Wilmington, Del.

There are numerous types of rosins and modified rosins available with differing levels of hydrogenation including gum rosins, wood rosins, tall-oil rosins, distilled rosins, dimerized rosins and polymerized rosins. Some specific modified rosins include glycerol and pentaerythritol esters of wood rosins and tall-oil rosins. Commercially available grades include, but are not limited to, Sylvatac™ 1103, a pentaerythritol rosin ester available from Arizona Chemical Co., Unitac™R-100 Lite, a pentaerythritol rosin ester from Union Camp in Wayne, N.J., Permalyn™ 305, a erythritol modified wood rosin available from Hercules and Foral 105 which is a highly hydrogenated pentaerythritol rosin ester also available from Hercules. Sylvatac™ R-85 and 295 are 85° C. and 95° C. melt point rosin acids available from Arizona Chemical Co. and Foral AX is a 70° C. melt point hydrogenated rosin acid available from Hercules, Inc. Nirez V-2040 is a phenolic modified terpene resin available from Arizona Chemical Co.

Another exemplary tackifier, Piccotac 115, has a viscosity at 350° F. (177° C.) of about 1600 centipoise. Other typical tackifiers have viscosities at 350° F. (177° C.) of much less than 1600 centipoise, for instance, from 50 to 300 centipoise.

Exemplary aliphatic resins include those available under the trade designations Eastotac™, Escorez™, Piccotac™, Mercures™, Wingtack™, Hi-Rez™, Quintone™, Taclirol™, etc. Exemplary polyterpene resins include those available under the trade designations Nirez™, Piccolyte™, Wingtack™, Zonarez™, etc. Exemplary hydrogenated resins include those available under the trade designations Escorez™, Arkon™, Clearon™, etc. Exemplary mixed aliphatic-aromatic resins include those available under the trade designations Escorez™, Regalite™, Hercures™, AR™, Imprez™, Norsolene™ M, Marukarez™, Arkon™ M, Quintone™, etc. Other tackifiers may be employed, provided they are compatible with the homogeneous linear or substantially linear ethylene/alpha.-olefin interpolymer.

Although the present invention has been described with a certain degree of particularity, it is to be understood that the examples below are merely for purposes of illustrating the present invention, the scope of the present invention is not intended to be defined by the claims.

PREPARATION OF EXAMPLES

Unless otherwise stated, the following test methods are employed and percentages or parts are by weight.

Density is measured in accordance with ASTM D-792. The samples are annealed at ambient conditions for 24 hours before the measurement is taken.

Comonomer content of the invention polymer is determined by Nuclear Magnetic Resonance (NMR) analysis. The analysis sample is prepared by adding about 3 g of a 50/50 mixture of tetrachloroethane-$d^2$/ortho-dichlorobenzene (to which sufficient chromium acetylacetonate is added so the mixture is 0.025M in the chromium compound) to a 0.4 g sample of the polymer in a 10 mm NMR tube. Samples are dissolved and homogenized in the tube by heating it and contents to 150° C./302° F. Data is collected using a Varian Unity Plus 400 MHz NMR spectrometer, corresponding to a $^{13}$C resonance frequency of 100.6 MHz. Acquisition parameters are selected to ensure quantitative $^{13}$C data acquisition in the presence of the chromium acetylacetonate which acts as a relaxation agent. Data is acquired using gated $^1$H decoupling, 4000 transients per data file, a 6 second pulse repetition delay, spectral width of 24,200 Hz and a file size of 64K data points with the probe head heated to 130° C./266° F.

Molecular weights are determined by gel permeation chromatography (GPC). The chromatographic system consists of either a Polymer Laboratories Model PL-210 or a Polymer Laboratories Model PL-220. The column and carousel compartments are operated at 140° C. Three Polymer Laboratories 10-micron Mixed-B columns are used with a solvent of 1,2,4 trichlorobenzene. The samples are prepared at a concentration of 0.1 g of polymer in 50 ml of solvent. The solvent used to prepare the samples contains 200 ppm of butylated hydroxytoluene (BHT). Samples are prepared by agitating lightly for 2 hours at 160° C. The injection volume used is 100 microliters and the flow rate is 1.0 ml/min. Calibration of the GPC column set is performed with narrow molecular weight distribution polystyrene standards available from Polymer Laboratories. The polystyrene standard peak molecular weights are converted to polyethylene molecular weights using appropriate Mark-Houwink coefficients for polyethylene and polystyrene (as described by Williams and Ward in Journal of Polymer Science, Polymer Letters, Vol. 6, (621) 1968) in the equation:

$$M_{polyethylene} = A(M_{polystyrene})^B$$

where M is the molecular weight, A has a value of 0.4316 and B is equal to 1.0. Polyethylene equivalent molecular weight calculations are performed using Viscotek TriSEC software Version 3.0.

Weight average molecular weight, $M_w$, is calculated in the usual manner according to the following formula: $M_j = (\Sigma w_i (M_i^j))^j$; where $w_i$ is the weight fraction of the molecules with molecular weight $M_i$ eluting from the GPC column in fraction i, and j=1 when calculating $M_w$, and j=−1 when calculating $M_n$.

Melt viscosity is determined in accordance with the following procedure: Viscosity was measured according to the ASTM D 3236 method, using a Brookfield Laboratories DVII+ Viscometer equipped with disposable aluminum sample chambers. The spindle used is a SC-31 hot-melt spindle, suitable for measuring viscosities in the range of from 30 to 100,000 centipoise. A cutting blade is employed to cut samples into pieces small enough to fit into the 1 inch wide, 5 inches long sample chamber. The sample is placed in the chamber, which is in turn inserted into a Brookfield Thermosel and locked into place with bent needle-nose pliers. The sample chamber has a notch on the bottom that fits the bottom of the Brookfield Thermosel to ensure that the chamber is not allowed to turn when the spindle is inserted and spinning. The sample is heated to the desired temperature (149° C./300° F. or 177° C./350° F.), with additional sample being added until the melted sample is about 1 inch below the top of the sample chamber. The viscometer apparatus is lowered and the spindle submerged into the sample chamber. Lowering is continued until brackets on the viscometer align on the Thermosel. The viscometer is turned on, and set to a shear rate which leads to a torque reading in the range of 30 to 60 percent. Readings are taken every minute for about 15 minutes, or until the values stabilize, which final reading is recorded.

The drop point is measured using ASTM D 3954 on a Mettler Toledo FP90 Central Processor with FP83HT Dropping Point Cell.

Percent crystallinity is determined by differential scanning calorimetry (DSC) using a TA Instruments supplied model Q1000 differential scanning chromatograph. A sample of about 5 to 8 mg size is cut from the material to be tested and placed directly in the DSC pan for analysis. For higher molecular weight materials a tin film is normally pressed from the sample, but for the samples of the present invention that preparation is normally not necessary as they are either too sticky or flow too readily during pressing. Samples for testing may, however, be cut from plaques that are prepared and used for density testing. The sample is first heated to 180° C. and held isothermally for 3 minutes at that temperature to ensure complete melting (the first heat). Then the sample is cooled at a rate of 10° C. per min to negative 60° C. and held there isothermally for 3 minutes, after which it is again heated (the second heat) at a rate of 10° C. per min to 150° C. and the thermogram from this second heat is referred to as the "second heat curve". Thermograms are plotted as watts/gram (energy) versus temperature.

Using heat of fusion data generated in the second heat curve (heat of fusion normally computed automatically by typical commercial DSC equipment by integration of the relevant area under that heat curve) the percent crystallinity in a sample may be calculated with the equation:

$$\text{Percent Cryst.} = (H_f/292 \text{ J/g}) \times 100,$$

where Percent Cryst. represents the percent crystallinity, and $H_f$ represents the heat of fusion of the ethylene interpolymer sample in Joules per gram (J/g).

Unless otherwise stated, melting points of samples of the interpolymers and adhesive formulations of the invention are determined from the second heat curves obtained from DSC as described above.

The evaluation of the adhesive properties of the invention formulations is conducted by coating onto 40 pound Kraft paper.

The Shear Adhesion Failure Temperature ("SAFT") test, (a commonly used test to evaluate adhesive performance, and well known to those versed in the industry) is conducted using a standard SAFT test method (ASTM D 4498) using 500 g weights. The tests are started at room temperature (25° C./77° F.) and the temperature increased at the average rate of 0.5 degrees C/min.

Peel Adhesion Failure Temperature ("PAFT") is conducted according to ASTM D-4498 modified for peel mode and using 100 gram weights.

laminate. Laminated samples are conditioned for at least 24 hours at the temperature selected for testing. A laminated sheet is held near one corner and using a spatula, one corner of one of the laminated sheets is folded back to form a hand-hold. With the laminate held as near as possible to the source of heating or cooling in order to maintain the conditioning temperature, the folded corner is manually pulled as rapidly as possible at roughly a 45 to 90 degree angle relative to each sheet's lengthwise axis to tear the adhesive bond. The percent of torn fiber is estimated (fiber tear or FT) in 25% increments; i.e., 0%, 25%, 50%, 75% and 100%. Unless otherwise stated, the FT test is normally repeated on five replicate samples and the average of these five runs is reported.

TABLE 1

Commercially Available Materials Used in Evaluations

| Ingredient | Supplier |
|---|---|
| Escorez 5637 | ExxonMobil Chemical Company Houston, TX - aromatic modified cycloaliphatic hydrocarbon tackifier resin with softening point of 127-133° C. |
| ADVANTRA ® HL-9250 | H.B. Fuller Company St. Paul, MN - formulated adhesive for carton and uncoated corrugated stocks with a viscosity at 350° F. of 860 cP and specific gravity of 0.929 g/cm$^3$. |
| ADVANTRA ® HL-9256 | H.B. Fuller Company St. Paul, MN - formulated adhesive for wrapper and coated carton stocks with a viscosity at 350° F. of 750 cP and specific gravity of 0.943 g/cm$^3$. |
| HL-7268 | H.B. Fuller Company St. Paul, MN - formulated adhesive for bonding a variety of substrates, with a viscosity at 350° F. of 960 cP |
| HL-2835 | H.B. Fuller Company St. Paul, MN - formulated adhesive with moderate speed of set, good flexibility, for bonding a variety of substrates, with a viscosity at 350° F. of 1070 cP. |
| 80-8488 | Henkel Consumer Adhesives Inc. Avon, OH - formulated adhesive for bonding a variety of substrates, with a viscosity at 350° F. of 1,080 cP. |
| 80-8368 | Henkel Consumer Adhesives Inc. Avon, OH - formulated adhesive for bonding a variety of substrates, with a viscosity at 350° F. of 970 cP. |

Samples for SAFT and PAFT testing are prepared using two sheets of 40 pound Kraft paper, each of about 6×12 in (152×305 mm) dimensions. On the bottom sheet, lengthwise and separated by a gap of 1 in (25 mm), are adhered in parallel fashion two 1.75 or 2 in (45 or 51 mm) wide strips of a one sided, pressure-sensitive tape such as masking tape. The adhesive sample to be tested is heated to 177° C. (350° F.) and is drizzled in an even manner down the center of the gap formed between the tape strips. Then before the adhesive can unduly thicken two glass rods, one rod riding immediately upon the tapes and shimmed on each side of the gap with a strip of the same tape followed by the second rod and (between the two rods) the second sheet of paper, are slid down the length of the sheets. This is done in a fashion such that the first rod evenly spreads the adhesive in the gap between the tape strips and the second rod evenly compress the second sheet over the top of the gap and on top of the tape strips. Thus a single 1 inch wide strip of sample adhesive is created, between the two tape strips, and bonding the paper sheets. The sheets so bonded are cut crosswise into strips of width 1 inch and length of about 3 inches, each strip having a 1×1 in (25×25 mm) adhesive sample bond in the center. The strips may then be employed in the SAFT or PAFT, as desired.

Percent Fiber Tear on corrugated paper board stock is conducted according to standard industry test methods. The adhesive is heated to 177° C./350° F. and is applied on the board stock cut into 1×3 in (25×76 mm) rectangular, sheets with the corrugated flutes running lengthwise. The adhesive to be tested is applied, running lengthwise, as about a 5 mm/0.2 in wide strip and may be drawn down with a spatula or hot melt applicator. Then a second strip is applied within 2 seconds and held, with moderate pressure, for 5 seconds to Polymer Preparation A series of ethylene/α-olefin interpolymers were also prepared in a 1 gallon oil jacketed, continuously stirred tank reactor. A magnetically coupled agitator with Lightning A-320 impellers provided the mixing. The reactor ran liquid full at 475 psig (3,275 kPa). Process flow was in at the bottom and out of the top. A heat transfer oil was circulated through the jacket of the reactor to remove some of the heat of reaction. At the exit of the reactor was a Micro-Motion™ flow meter that measured flow and solution density. All lines on the exit of the reactor were traced with 50 psi (344.7 kPa) steam and insulated.

Isopar E solvent and comonomer were supplied to the reactor at 30 psig (206.8 kPa) pressure. The solvent feed to the reactors was measured by a Micro-Motion™ mass flow meter. A variable speed diaphragm pump controlled the solvent flow rate and increased the solvent pressure to reactor pressure. The comonomer was metered by a Micro-Motion™ mass flow meter and flow controlled by a Research control valve. The comonomer stream was mixed with the solvent stream at the suction of the solvent pump and is pumped to the reactor with the solvent. The remaining solvent was combined with ethylene and (optionally) hydrogen and delivered to the reactor. The ethylene stream was measured by a Micro-Motion™ mass flow meter just prior to the Research valve controlling flow. Three Brooks flow meter/controllers (1-200 sccm and 2-100 sccm) were used to deliver hydrogen into the ethylene stream at the outlet of the ethylene control valve.

The ethylene or ethylene/hydrogen mixture combined with the solvent/comonomer stream at ambient temperature. The temperature of the solvent/monomer as it enters the reactor was controlled with two heat exchangers. This stream enters the bottom of the 1 gallon continuously stirred tank reactor.

In an inert atmosphere box, a solution of the transition metal compounds was prepared by mixing the appropriate volumes of concentrated solutions of each of the two components with solvent to provide the final catalyst solution of known concentration and composition. This solution was transferred under nitrogen to a pressure vessel attached to a high-pressure metering pump for transport to the polymerization reactor.

In the same inert atmosphere box, solutions of the primary cocatalyst, methylbis(hydrogenatedtallowalkyl) ammonium tetrakis (pentafluorophenyl)borate and the secondary cocatalyst, MMAO Type 3A, were prepared in solvent and transferred to separate pressure vessels as described for the catalyst solution. The ratio of Al to transition metal and B to transition metal was established by controlling the volumetric flow output if the individual metering pumps to attain the molar ratios in the polymerization reactor as presented in Table 2. The multiple component catalyst system and its solvent flush also enter the reactor at the bottom but through a different port than the monomer stream.

Polymerization was stopped with the addition of water into the reactor product line after the meter measuring the solution density. The reactor effluent stream then entered a post reactor heater that provides additional energy for the solvent removal flash. This flash occurs as the effluent exits the post reactor heater and the pressure is dropped from 475 psig down to 10 at the reactor pressure control valve.

This flashed polymer entered a hot oil jacketed devolatilizer. Approximately 90% of the volatiles were removed from the polymer in the devolatilizer. The volatiles exit the top of the devolatilizer. The remaining stream is condensed with a chilled water jacketed exchanger and then enters a glycol jacket solvent/ethylene separation vessel. Solvent is removed from the bottom of the vessel and ethylene vents from the top. The ethylene stream is measured with a Micro-Motion mass flow meter. This measurement of unreacted ethylene was used to calculate the ethylene conversion. The polymer separated in the devolatilizer and was pumped out with a gear pump. The product is collected in lined pans and dried in a vacuum oven at 140° C. for 24 hr.

Table 2 summarizes the kinetic parameters of the catalysts used, Table 3 summarizes the polymerization conditions and Table 4 the properties of the resulting polymers.

TABLE 2

Reactivity Ratios of Catalysts Used in the Present Invention

| Catalyst[a] | Reactivity Ratio[b] |
|---|---|
| CAT-1 | 13 |
| CAT-2 | 3 |
| CAT-3 | 90 |
| CAT-4 | 8 |

[a]CAT 1 was $(C_5Me_4SiMe_2N^tBu)Ti(\eta^4\text{-}1,3\text{-pentadiene})$ prepared according to Example 17 of U.S. Pat. No. 5,556,928, the entire disclosure of which patent is incorporated herein by reference.
CAT 2 was (1H-cyclopenta[1]-phenanthrene-2-yl)dimethyl (t-butylamido) silanetitanium dimethyl prepared according to Examples 1 and 2 of U.S. Pat. 5,150,297, the entire disclosure of which patent is incorporated herein by reference.
CAT 3 was $(C_5Me_4SiMe_2N^tBu)ZrMe_2$ prepared according to Examples 1 and 86 of U.S. Pat. No. 5,703,187, the entire disclosure of which patent is incorporated herein by reference.
CAT 4 was [N-(1,1-dimethylethyl)-1,1-dimethyl-1-[1,2,3,4,5-$\eta$)-3,4-diphenyl-2,4-cyclopentadienyl-1-yl]silanaminato(2)-$\kappa$N]-dimethyl-titanium, prepared according to Examples 1 and 2 of WO 02/092610, the entire disclosure of which patent is incorporated herein by reference.
[b]Measured at 150° C. using octene-1 as comonomer

TABLE 3

Ethylene/α-Olefin Interpolymers Preparation Conditions

| Ex # | Reactor Temp ° C. | Solvent Flow lb/hr | Ethylene Flow lb/hr | Octene Flow lb/hr | Hydrogen Flow sccm | C2 Conversion (%) | B[a]/Tr[c] Molar Ratio | MMAO[b]/Tr[c] Molar Ratio | Catalysts | Mole Ratio Catalyst | $r_1^H/r_1^L$ d |
|---|---|---|---|---|---|---|---|---|---|---|---|
| 1 | 150.32 | 25.20 | 2.68 | 1.25 | 174.48 | 89.47 | 1.21 | 10.07 | CATS-1/2 | 1:1 | 13/3 |
| 2 | 150.50 | 25.76 | 2.65 | 0.86 | 111.75 | 89.69 | 1.47 | 6.01 | CATS-1/2 | 1:3 | 13/3 |
| 3 | 150.38 | 25.80 | 2.65 | 0.76 | 113.80 | 90.37 | 1.51 | 6.04 | CATS-1/2 | 1:3 | 13/3 |
| 4 | 149.88 | 25.77 | 2.65 | 0.85 | 150.35 | 80.15 | 1.37 | 5.96 | CATS 1/2 | 1:3 | 13/3 |
| 5 | 129.73 | 20.87 | 2.65 | 1.03 | 97.77 | 90.46 | 1.47 | 5.99 | CATS 1/3 | 1:1 | 13/90 |
| 6 | 130.03 | 20.81 | 2.65 | 1.06 | 69.90 | 90.13 | 1.48 | 5.83 | CATS 1/3 | 1:20 | 13/90 |
| 7 | 119.13 | 20.78 | 2.65 | 1.17 | 47.98 | 90.03 | 1.49 | 5.93 | CATS 1/3 | 1:20 | 13/90 |
| 8 | 149.65 | 25.51 | 2.65 | 1.00 | 83.20 | 90.40 | 1.06 | 4.95 | CATS-1/4 | 1:1 | 13/8 |
| 9 | 120.28 | 25.20 | 2.65 | 1.60 | 13.45 | 90.44 | 1.08 | 4.91 | CATS 1/3 | 1:10 | 13/90 |
| 10 | 150.20 | 25.60 | 2.65 | 0.73 | 121.97 | 90.35 | 1.08 | 4.95 | CATS 2/4 | 2:1 | 3/8 |

[a]The primary cocatalyst for all polymerizations was Armeenium Borate, [methylbis(hydrogenatedtallowalkyl) ammonium tetrakis (pentafluorophenyl)borate prepared as in U.S. Pat. No. 5,919,983, Ex. 2, the entire disclosure of which patent is incorporated herein by reference.
[b]The secondary cocatalyst for all polymerizations was a modified methylalumoxane (MMAO) available from Akzo Nobel as MMAO-3A (CAS# 146905-79-10).
[c]For Examples 1-4, 8 and 10 the term Tr refers to the total titanium content of the mixed catalyst system. For Examples 5-7 and 9 the term Tr refers to the Zr content only of the mixed catalyst system.
[d]For Examples 1-4 and 8 it can be noted that the $r_1^H/r_1^L$ ratio exceeds unity and, surprisingly (see Table 5), properties of formulations made from such interpolymers are quite good and comparable to those from Examples 5-7 and 9-10.

TABLE 4

Properties of Ethylene/1-Octene Interpolymers

| Ex # | Viscosity @ 300° F. (cP) | Density (g/cm³) | $M_w$ | $M_n$ | $M_w/M_n$ | Wt % Com. | Mol % Com. | Drop Point (° C.) | $T_{m1}$ (° C.) | $T_{m2}$ (° C.) | $T_{m3}$ (° C.) | Heat of Fusion (J/g) | % Cryst. | $T_c1$ (° C.) | $T_c2$ (° C.) | $T_c3$ (° C.) |
|---|---|---|---|---|---|---|---|---|---|---|---|---|---|---|---|---|
| 1 | 1,600 | 0.8941 | 9,570 | 4,180 | 2.29 | 23.40 | 7.10 | 113.3 | 81.2 | 107.0 | 111.1 | 96.2 | 33 | 97.1 | 55.0 | |
| 2 | 2,879 | 0.9040 | 11,200 | 5,030 | 2.23 | 19.80 | 5.81 | 116.9 | 86.3 | 110.3 | 114.6 | 113.3 | 39 | 99.8 | 73.4 | |
| 3 | 2,859 | 0.9083 | 11,300 | 5,220 | 2.16 | 18.30 | 5.30 | 117.8 | 89.4 | 111.4 | 115.6 | 121.4 | 42 | 101.2 | 77.1 | |
| 4 | 2,744 | 0.9092 | 10,900 | 5,060 | 2.15 | 18.10 | 5.23 | 118.4 | 90.0 | 112.3 | 116.1 | 125.9 | 43 | 102.7 | 78.2 | |
| 5 | 2,804 | 0.9091 | 11,200 | 2,700 | 4.15 | 18.40 | 5.34 | 109.6 | 103.3 | | | 120.7 | 41 | 91.1 | 52.1 | |
| 6 | 2,889 | 0.9089 | 12,000 | 2,080 | 5.77 | 18.90 | 5.50 | 112.1 | 95.1 | 107.2 | | 125.8 | 43 | 94.7 | | |
| 7 | 2,684 | 0.9052 | 12,800 | 1,590 | 8.05 | 19.30 | 5.64 | 113.5 | 93.7 | 110.2 | | 130.9 | 45 | 97.1 | 81.1 | |
| 8 | 3,047 | 0.9086 | 11,000 | 4,610 | 2.39 | 17.70 | 5.10 | 109.6 | 96.7 | 103.3 | | 130.2 | 45 | 93.6 | 54.2 | |
| 9 | 3,113 | 0.9067 | 17,000 | 1,130 | 15.04 | 18.80 | 5.50 | 116.1 | 93.1 | 113.7 | | 136.7 | 47 | 100.8 | | |
| 10 | 2,855 | 0.9084 | 10,800 | 3,940 | 2.74 | 18.30 | 6.30 | 114.6 | 93.3 | 105.6 | 110.6 | 134.7 | 46 | 95.0 | 82.3 | 55.1 |

Preparation of Adhesive Formulations with Tackifier.

Ingredients were blended in a metal container to a total weight of 100 g. Tackifier resin was added into the container and allowed to heat for 10 minutes with a heating mantle for temperature control. The polymer was slowly added over 3-5 minutes. Once melted, the ingredients were mixed by hand using a metal spatula at a moderate rate of speed. After complete addition of the polymer, the adhesive was allowed to mix an additional 15 minutes to assure uniformity. The final adhesive temperature in all cases was 350-360° F. (~177-182° C.). The properties of the resulting adhesives are summarized in Table 5 and may be compared with the properties of some commercially available adhesives summarized in Table 6.

TABLE 5

Properties of Hot Melt Adhesives Made From Ethylene/Octene Interpolymers of the Present Invention

| Polymer Ex # | Polymer (wt %) | Escorez 5637 (wt %) | Paper Tear (%)* | | | | | PAFT (° F.) | SAFT (° F.) | Viscosity @ 350° F. (cP) |
| | | | 0° F. | 35° F. | 77° F. | 120° F. | 140° F. | | | |
|---|---|---|---|---|---|---|---|---|---|---|
| 1 | 78 | 22 | 0 | 25 | | 100 | 100 | 110 | 205 | 1,115 |
| 1 | 73 | 27 | 0 | 0 | | 100 | 100 | 119 | 203 | 1,050 |
| 1 | 68 | 32 | 0 | 0 | | 100 | 100 | 128 | 201 | 950 |
| 2 | 78 | 22 | 0 | 100 | 100 | 100 | 75 | 110 | 211 | 1,060 |
| 2 | 73 | 27 | 0 | 100 | 100 | 100 | 100 | 118 | 208 | 935 |
| 2 | 68 | 32 | 0 | 0 | 100 | 100 | 100 | 131 | 208 | 820 |
| 3 | 78 | 22 | 0 | 50 | 100 | 100 | 100 | 110 | 215 | 1,080 |
| 3 | 73 | 27 | 0 | 25 | 100 | 100 | 100 | 132 | 212 | 980 |
| 3 | 68 | 32 | 0 | 0 | 100 | 100 | 100 | 156 | 211 | 660 |
| 4 | 78 | 22 | 0 | 50 | 100 | 100 | 75 | 120 | 215 | 570 |
| 4 | 73 | 27 | 0 | 25 | 100 | 100 | 100 | 122 | 213 | 500 |
| 4 | 68 | 32 | 0 | 0 | 100 | 100 | 100 | 132 | 211 | 470 |
| 5 | 78 | 22 | 0 | 100 | 100 | 100 | 50 | 111 | 203 | 1,050 |
| 5 | 73 | 27 | 0 | 25 | 100 | 100 | 100 | 115 | 202 | 960 |
| 5 | 68 | 32 | 0 | 0 | 100 | 100 | 100 | 118 | 200 | 860 |
| 6 | 78 | 22 | 0 | 50 | 100 | 100 | 100 | 104 | 203 | 1,000 |
| 6 | 73 | 27 | 0 | 0 | 100 | 100 | 100 | 115 | 202 | 945 |
| 6 | 68 | 32 | 0 | 0 | 100 | 100 | 100 | 124 | 200 | 850 |
| 7 | 78 | 22 | 25 | 25 | NM | 50 | 50 | 95 | 209 | 925 |
| 7 | 73 | 27 | 0 | 25 | 100 | 100 | 75 | 109 | 207 | 840 |
| 7 | 68 | 32 | 0 | 0 | 100 | 100 | 100 | 127 | 205 | 755 |
| 8 | 83 | 17 | 0 | 100 | NM | 100 | 100 | 90 | 214 | 1300 |
| 8 | 78 | 22 | 0 | 50 | NM | 100 | 100 | 109 | 208 | 1205 |
| 8 | 73 | 27 | 0 | 0 | NM | 100 | 100 | 126 | 207 | 1100 |
| 8 | 68 | 32 | 0 | 0 | NM | 100 | 100 | 128 | 207 | 1035 |
| 9 | 83 | 17 | 100 | 100 | NM | 50 | 0 | 90 | 212 | 1140 |
| 9 | 78 | 22 | 100 | 100 | NM | 100 | 0 | 90 | 210 | 1070 |
| 9 | 73 | 27 | 75 | 100 | NM | 100 | 75 | 90 | 208 | 930 |
| 9 | 68 | 32 | 0 | 100 | NM | 100 | 100 | 111 | 208 | 810 |
| 10 | 83 | 17 | 0 | 100 | NM | 100 | 100 | 105 | 205 | 1175 |
| 10 | 78 | 22 | 0 | 100 | NM | 100 | 100 | 112 | 204 | 1115 |
| 10 | 73 | 27 | 0 | 100 | NM | 100 | 100 | 126 | 202 | 1040 |
| 10 | 68 | 32 | 0 | 0 | NM | 100 | 100 | 131 | 203 | 920 |

*NM = not measured

TABLE 6

Properties of Commercial Hot Melt Adhesives

| Comp Ex # | Commercial Name | Viscosity @ 350° F. (cP) | Paper Tear (%) | | | | | PAFT (° F.) | SAFT (° F.) |
|---|---|---|---|---|---|---|---|---|---|
| | | | 0° F. | 35° F. | 77° F. | 120° F. | 140° F. | | |
| 1 | ADVANTRA HL-9250 | 860 | 100 | 100 | 100 | 100 | 100 | 142 | 198 |
| 2 | ADVANTRA HL-9256 | 750 | 0 | 100 | 100 | 100 | 100 | 151 | 192 |
| 3 | HL-7268 | 960 | — | — | 100 | 100 | 100 | 144 | 192 |
| 4 | HL-2835 | 1,070 | 100 | 100 | 100 | 100 | 100 | 126 | 153 |
| 5 | 80-8488 | 1,080 | — | 100 | 100 | 100 | 100 | 150 | 176 |
| 6 | 80-8368 | 970 | — | 100 | 100 | 100 | 100 | 142 | 190 |

We claim:

1. An ethylene interpolymer having the following properties:
   i) a number average molecular weight (Mn) from 1,000 to 9,000; and
   ii) a Brookfield Viscosity (measured at 149° C./300° F.) from 500 to 9,000 cP; and wherein the interpolymer comprises a high weight average molecular weight polymer component ($M_{wH}$) and a low weight average molecular weight polymer component ($M_{wL}$), and wherein the ratio $M_{wH}/M_{wL}$ is from about 1.5 to about 20.

2. The ethylene interpolymer of claim 1, wherein interpolymer has iii) a density from 0.88 to 1.06 g/cm³.

3. The ethylene interpolymer of claim 2, wherein the interpolymer is derived from olefinic comonomer reactants, comprising at least ethylene and styrene, and has iii) a density from 0.931 to 1.06 g/cm³.

4. The ethylene interpolymer of claim 2, wherein the interpolymer has iii) a density from 0.88 to 0.93 g/cm³.

5. The ethylene interpolymer of claim 4, wherein the interpolymer has the following properties:
   i) a density from 0.89 to 0.92 g/cm³;
   ii) a number average molecular weight (Mn) from 1250 to 7,000; and
   iii) a Brookfield Viscosity (measured at 149° C./300° F.) from 1,000 to 6,000 cP; and wherein, when the one or more tackifiers are added, in an amount from 20 to 35 percent by weight (based on the combined weight of interpolymer and tackifier), to said ethylene interpolymer, the resulting composition has the following properties:
   a) a Brookfield Viscosity (measured at 177° C./350° F.) from 500 to 1,400 cP;
   b) a Peel Adhesion Failure Temperature (PAFT) greater than, or equal to, 115° F.; and
   c) a Shear Adhesion Failure Temperature (SAFT) greater than, or equal to, 150° F.; and
   d) 100% paper tear from 35 to 140° F.

6. The ethylene interpolymer of claim 4, wherein interpolymer has the following properties:
   i) a density from 0.895 to 0.915 g/cm³;
   ii) a number average molecular weight (Mn) from 1500 to 6,000; and
   iii) a Brookfield Viscosity (measured at 149° C./300° F.) from 1,500 to 5,000 cP; and wherein, when the one or more tackifiers are added, in an amount from 20 to 35 percent by weight (based on the combined weight of interpolymer and tackifier), to said ethylene interpolymer, then the resulting composition has the following properties:
   a) a Brookfield Viscosity (measured at 177° C./350° F.) from 750 to 1,200 cP;
   b) a Peel Adhesion Failure Temperature (PAFT) greater than, or equal to, 120° F.; and
   c) a Shear Adhesion Failure Temperature (SAFT) greater than, or equal to, 170° F.; and
   d) a 100% paper tear from 0 to 140° F.

7. The ethylene interpolymer of claim 4, wherein said interpolymer is a copolymer of ethylene/propylene, ethylene/1-butene, ethylene/4-methyl-1-pentene, ethylene/1-pentene, ethylene/1-hexene or ethylene/1-octene.

8. The ethylene interpolymer of claim 1, produced by a process comprising:
   a) contacting one or more olefinic monomers in the presence of at least a high molecular weight catalyst having a reactivity ratio $r_1^H$, and at least a low molecular weight catalyst having a reactivity ratio $r_1^L$, in a single reactor; and
   b) effectuating the polymerization of the olefinic monomers in the reactor, to obtain an olefin polymer; and
   wherein each of $r_1^H$ and $r_1^L$ is from about 1 to about 200, and $r_1^H/r_1^L$ is from 0.03 to 30; and/or
   wherein the high molecular weight catalyst is capable of producing a polymer with a high molecular weight $M_{wH}$ from the monomers, under selected polymerization conditions, and the low molecular weight catalyst is capable of producing a polymer with a low molecular weight $M_{wL}$ from the same monomers, under substantially the same polymerization conditions, and wherein $M_{wH}/M_{wL}$ is from 1.5 to 20.

9. The ethylene interpolymer of claim 1, wherein the interpolymer contains the residue of at least two catalysts, a first catalyst having a reactivity ratio $r_1^H$, and a second catalyst having a reactivity ratio $r_1^L$, and wherein each of $r_1^H$ and $r_1^L$, independently, is a number from 1 to 200, and $r_1^H/r_1^L$ is a number from 0.03 to 30.

10. The ethylene interpolymer of claim 9, wherein the ratio $r_1^H/r_1^L$ is a number greater than 1.

11. The ethylene interpolymer of claim 1, wherein the interpolymer has a number average molecular weight from 2,000 to 9,000.

12. The ethylene interpolymer of claim 1, wherein the interpolymer as a Brookfield Viscosity (measured at 149° C. (300° F.)) from 1,500 to 9,000 cP.

13. The ethylene interpolymer of claim 1, wherein the ratio, $M_{wH}/M_{wL}$, is from about 2 to about 10.

14. The ethylene interpolymer of claim 1, wherein the interpolymer has a molecular weight distribution ($M_w/M_n$) from about 2 to about 20.

15. The ethylene interpolymer of claim 1, wherein, when one or more tackifiers are added, in an amount of from 15 to 40 percent, by weight (based on the combined weight of interpolymer and tackifier), to said ethylene interpolymer, the resulting composition has the following properties:

a) a Brookfield Viscosity (measured at 177° C./350° F.) from 400 to 2,000 cP;
b) a Peel Adhesion Failure Temperature (PAFT) of greater than, or equal to, 110° F.; and
c) a Shear Adhesion Failure Temperature (SAFT) of greater than, or equal to, 140° F.

* * * * *